(12) United States Patent
Kan-o

(10) Patent No.: US 6,525,790 B1
(45) Date of Patent: Feb. 25, 2003

(54) LIQUID CRYSTAL MODULE MOUNTING STRUCTURE

(75) Inventor: Toshiaki Kan-o, Yamagata (JP)

(73) Assignee: NEC Corporation, Tokyo (JP)

( * ) Notice: Subject to any disclaimer, the term of this patent is extended or adjusted under 35 U.S.C. 154(b) by 281 days.

(21) Appl. No.: 09/614,594

(22) Filed: Jul. 12, 2000

(30) Foreign Application Priority Data

Jul. 15, 1999 (JP) .......................................... 11-201895

(51) Int. Cl.⁷ .............................................. G02F 1/1333
(52) U.S. Cl. ......................... 349/58; 361/681; 361/683
(58) Field of Search .......................... 349/58; 361/681, 361/683

(56) References Cited

U.S. PATENT DOCUMENTS 6,175,396 B1 * 1/2001 Kim et al. ..................... 349/58
6,330,148 B1 * 12/2001 Won et al. ................... 361/681

FOREIGN PATENT DOCUMENTS

| JP | 3-47586 | 5/1991 |
|----|---------|--------|
| JP | 4-291319 | 10/1992 |
| JP | 9-288455 | 11/1997 |
| JP | 10-319376 | 12/1998 |
| JP | 11-6998 | 1/1999 |

* cited by examiner

Primary Examiner—Toan Ton
Assistant Examiner—Hoan Nguyen
(74) Attorney, Agent, or Firm—Sughrue Mion, PLLC

(57) ABSTRACT

A liquid crystal module mounting structure enabling various kinds of different liquid crystal modules to be mounted on a casing with ease, in which at a sidewall portion of a box-formed casing for housing a liquid crystal module unit, an attachment part is provided to which a fixing piece of substantially L-shaped is attached, and the liquid crystal module unit is held by the pressing of a peripheral portion of said liquid crystal module unit housed in the casing from the side of a screen by the fixing piece attached to the attachment part.

36 Claims, 36 Drawing Sheets

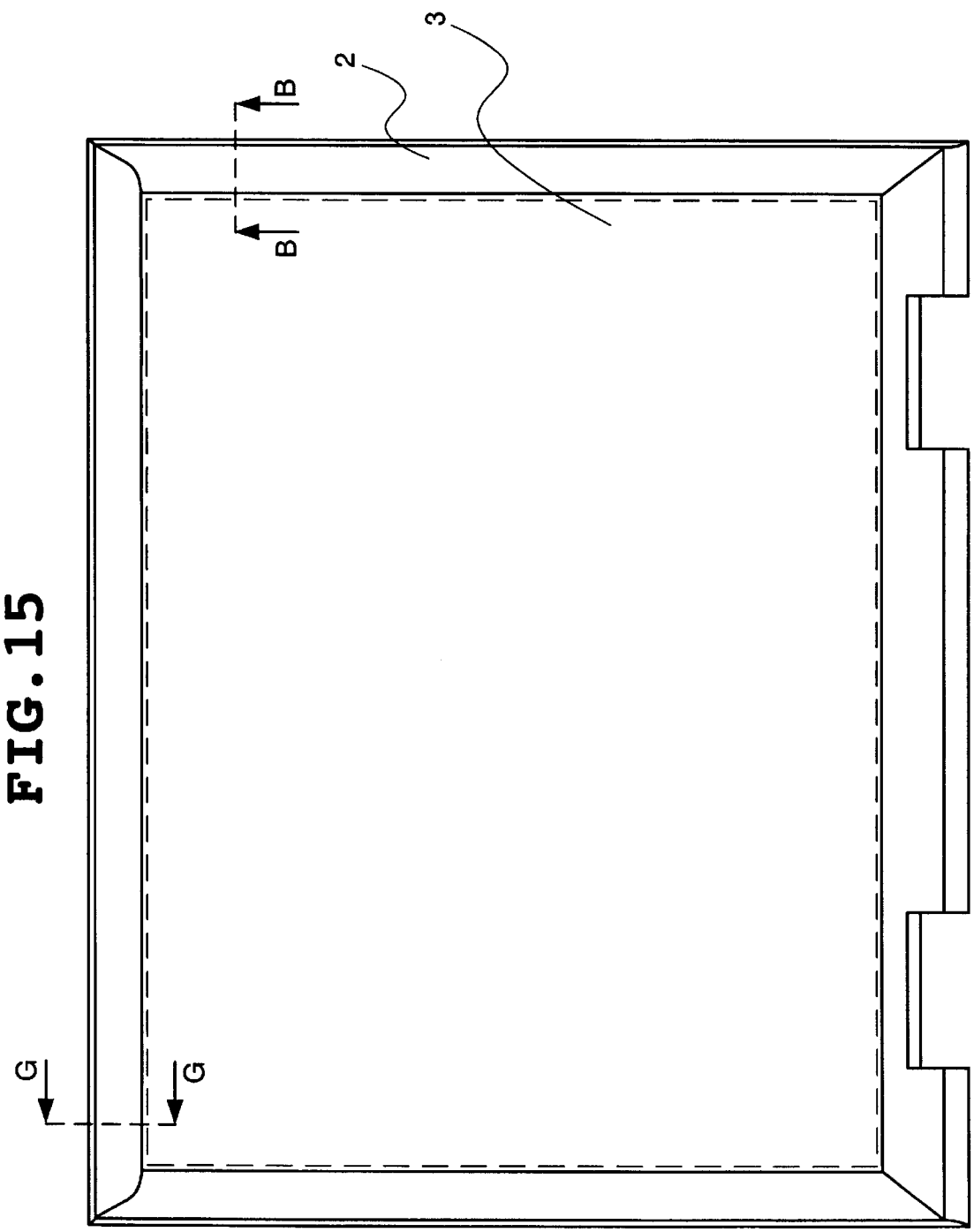

LIQUID CRYSTAL MODULE MOUNTING STRUCTURE

BACKGROUND OF THE INVENTION

1. Filed of the Invention

The present invention relates to a mounting structure for a liquid crystal module for use in a portable information processor etc. and, more particularly, to a liquid crystal module mounting structure enabling various kinds of liquid crystal modules to be mounted on a casing with ease.

2. Description of the Related Art

It is a common practice for conventional portable information processor such as a notebook-sized personal computer to adopt a liquid crystal module (hereinafter referred to as a LCD) for use in a display unit. In addition, various kinds of LCDs manufactured by a plurality of manufactures are often packaged in one portable information processor.

In conventional LCD mounting, most frequently used is a system called "side-mount system" of directly fixing a screw hole provided on a side surface of an LCD and a casing by means of a screw.

Mounting various kinds of LCDs on one kind of casing as described above, however, requires provision of a plurality of holes in the casing corresponding to attaching holes of each LCD in advance or preparation of as many attachment parts for connecting the LCDs and the casing as the number of kinds of the LCDs.

As mentioned above, among conventional LCD mounting structures, the system in which a plurality of attaching holes are provided for each LCD has problems in strength and appearances because numerous attaching holes are visible outside. The system using sheet metal parts also has a shortcoming that attachment parts should be prepared as many as the number of kinds of LCDs.

SUMMARY OF THE INVENTION

An object of the present invention is to eliminate the above-described shortcomings of conventional art and provide a liquid crystal module mounting structure enabling various kinds of different liquid crystal modules to be mounted on a casing with ease without the need of neither provision of a plurality of holes corresponding to attaching holes of liquid crystal modules in advance nor preparation of attachment parts for each liquid crystal module.

According to one aspect of the invention, a liquid crystal module mounting structure, wherein at a sidewall portion of a box-formed casing for housing a liquid crystal module unit, an attachment part is provided to which a fixing piece of substantially L-shaped is attached, and the liquid crystal module unit is held by the pressing of a peripheral portion of the liquid crystal module unit housed in the casing from the side of a screen by the fixing piece attached to the attachment part.

In the preferred construction, the attachment part is provided at four positions in the vicinity of the four corners of the casing and formed as an external projection of a part of the sidewall portion of the casing to have resiliency.

In another preferred construction, the attachment part is provided at four positions in the vicinity of the four corners of the casing, and a screw hole is provided in the attachment part to enable the fixing piece to be attached to the attachment part by means of a screw.

In another preferred construction, the attachment part is formed as an external projection of a part of the sidewall portion of the casing to have resiliency, and a screw hole is provided in the attachment part to enable the fixing piece to be attached to the attachment part by means of a screw.

In another preferred construction, the attachment part is provided at four positions in the vicinity of the four corners of the casing and formed as an external projection of a part of the sidewall portion of the casing to have resiliency, and a screw hole is provided in the attachment part to enable the fixing piece to be attached to the attachment part by means of a screw.

In another preferred construction, the attachment part is provided at four positions in the vicinity of the four corners of the casing, in the vicinity of the four corners of the casing, a tab is provided for screwing to a box-formed case into which the casing is to be incorporated, at a position on the side of the case corresponding to the tab, a boss having a screw hole is provided, and the casing which houses the liquid crystal module unit is incorporated into the case by screwing the tab to the boss.

In another preferred construction, the attachment part is formed as an external projection of a part of the sidewall portion of the casing to have resiliency, in the vicinity of the four corners of the casing, a tab is provided for screwing to a box-formed case into which the casing is to be incorporated, at a position on the side of the case corresponding to the tab, a boss having a screw hole is provided, and the casing which houses the liquid crystal module unit is incorporated into the case by screwing the tab to the boss.

In another preferred construction, the attachment part is provided at four positions in the vicinity of the four corners of the casing and formed as an external projection of a part of the sidewall portion of the casing to have resiliency, in the vicinity of the four corners of the casing, a tab is provided for screwing to a box-formed case into which the casing is to be incorporated, at a position on the side of the case corresponding to the tab, a boss having a screw hole is provided, and the casing which houses the liquid crystal module unit is incorporated into the case by screwing the tab to the boss.

In another preferred construction, the attachment part is provided at four positions in the vicinity of the four corners of the casing, a screw hole is provided in the attachment part to enable the fixing piece to be attached to the attachment part by means of a screw, in the vicinity of the four corners of the casing, a tab is provided for screwing to a box-formed case into which the casing is to be incorporated, at a position on the side of the case corresponding to the tab, a boss having a screw hole is provided, and the casing which houses the liquid crystal module unit is incorporated into the case by screwing the tab to the boss.

In another preferred construction, the attachment part is provided at four positions in the vicinity of the four corners of the casing and formed as an external projection of a part of the sidewall portion of the casing to have resiliency, a screw hole is provided in the attachment part to enable the fixing piece to be attached to the attachment part by means of a screw, in the vicinity of the four corners of the casing, a tab is provided for screwing to a box-formed case into which the casing is to be incorporated, at a position on the side of the case corresponding to the tab, a boss having a screw hole is provided, and the casing which houses the liquid crystal module unit is incorporated into the case by screwing the tab to the boss.

In another preferred construction, the attachment part is provided at four positions in the vicinity of the four corners of the casing, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, and the casing housing the liquid crystal module unit is incorporated into the case by inserting the first tab into the holder part and screwing the second tab to the boss.

In another preferred construction, the attachment part is provided at four positions in the vicinity of the four corners of the casing and formed as an external projection of a part of the sidewall portion of the casing to have resiliency, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, and the casing housing the liquid crystal module unit is incorporated into the case by inserting the first tab into the holder part and screwing the second tab to the boss.

In another preferred construction, the attachment part is provided at four positions in the vicinity of the four corners of the casing, a screw hole is provided in the attachment part to enable the fixing piece to be attached to the attachment part by means of a screw, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, and the casing housing the liquid crystal module unit is incorporated into the case by inserting the first tab into the holder part and screwing the second tab to the boss.

In another preferred construction, the attachment part is provided at four positions in the vicinity of the four corners of the casing, a screw hole is provided in the attachment part to enable the fixing piece to be attached to the attachment part by means of a screw, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, the casing housing the liquid crystal module unit is incorporated into the case by inserting the first tab into the holder part and screwing the second tab to the boss, and the holder part of the case is formed into a pocket whose section is L-shaped at a position inwardly apart from the sidewall of the case.

In another preferred construction, the attachment part is provided at four positions in the vicinity of the four corners of the casing and formed as an external projection of a part of the sidewall portion of the casing to have resiliency, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, the casing housing the liquid crystal module unit is incorporated into the case by inserting the first tab into the holder part and screwing the second tab to the boss, and the holder part of the case is formed into a pocket whose section is L-shaped at a position inwardly apart from the sidewall of the case.

In another preferred construction, the attachment part is provided at four positions in the vicinity of the four corners of the casing, a screw hole is provided in the attachment part to enable the fixing piece to be attached to the attachment part by means of a screw, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, the casing housing the liquid crystal module unit is incorporated into the case by inserting the first tab into the holder part and screwing the second tab to the boss, and the holder part of the case is formed into a pocket whose section is L-shaped at a position inwardly apart from the sidewall of the case.

In another preferred construction, the attachment part is provided at four positions in the vicinity of the four corners of the casing and formed as an external projection of a part of the sidewall portion of the casing to have resiliency, a screw hole is provided in the attachment part to enable the fixing piece to be attached to the attachment part by means of a screw, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, the casing housing the liquid crystal module unit is incorporated into the case by inserting the first tab into the holder part and screwing the second tab to the boss, and the holder part of the case is formed into a pocket whose section is L-shaped at a position inwardly apart from the sidewall of the case.

In another preferred construction, the attachment part is provided at four positions in the vicinity of the four corners of the casing, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, the casing housing the liquid crystal module unit is incorporated into the case by inserting the first tab into the holder part and screwing the second tab to the boss, and the holder part of the case is formed into a pocket whose section is L-shaped at the sidewall portion of the case.

In another preferred construction, the attachment part is provided at four positions in the vicinity of the four corners of the casing and formed as an external projection of a part of the sidewall portion of the casing to have resiliency, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, the casing housing the liquid crystal module unit is incorporated into the case by inserting the first tab into the holder part and screwing the second tab to the boss, and the holder part of the case is formed into a pocket whose section is L-shaped at the sidewall portion of the case.

In another preferred construction, the attachment part is provided at four positions in the vicinity of the four corners of the casing, a screw hole is provided in the attachment part to enable the fixing piece to be attached to the attachment part by means of a screw, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, the casing housing the liquid crystal module unit is incorporated into the case by inserting the first tab into the holder part and screwing the second tab to the boss, and the holder part of the case is formed into a pocket whose section is L-shaped at the sidewall portion of the case.

In another preferred construction, the attachment part is provided at four positions in the vicinity of the four corners of the casing and formed as an external projection of a part of the sidewall portion of the casing to have resiliency, a screw hole is provided in the attachment part to enable the fixing piece to be attached to the attachment part by means of a screw, on one of an upper portion and a lower portion of the casing, a first tab externally projecting from the sidewall is provided and on the other a second tab is provided for screwing to a box-formed case into which the casing is to be incorporated, at a position of the case into which the casing is to be incorporated corresponding to the first tab, a holder part is provided for allowing the first tab to be inserted and held and at a position corresponding to the second tab, a boss having a screw hole is provided, the casing housing the liquid crystal module unit is incorporated into the case by inserting the first tab into the holder part and screwing the second tab to the boss, and the holder part of the case is formed into a pocket whose section is L-shaped at the sidewall portion of the case.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 15 is a plan view of a state where a front of the first embodiment is mounted;

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
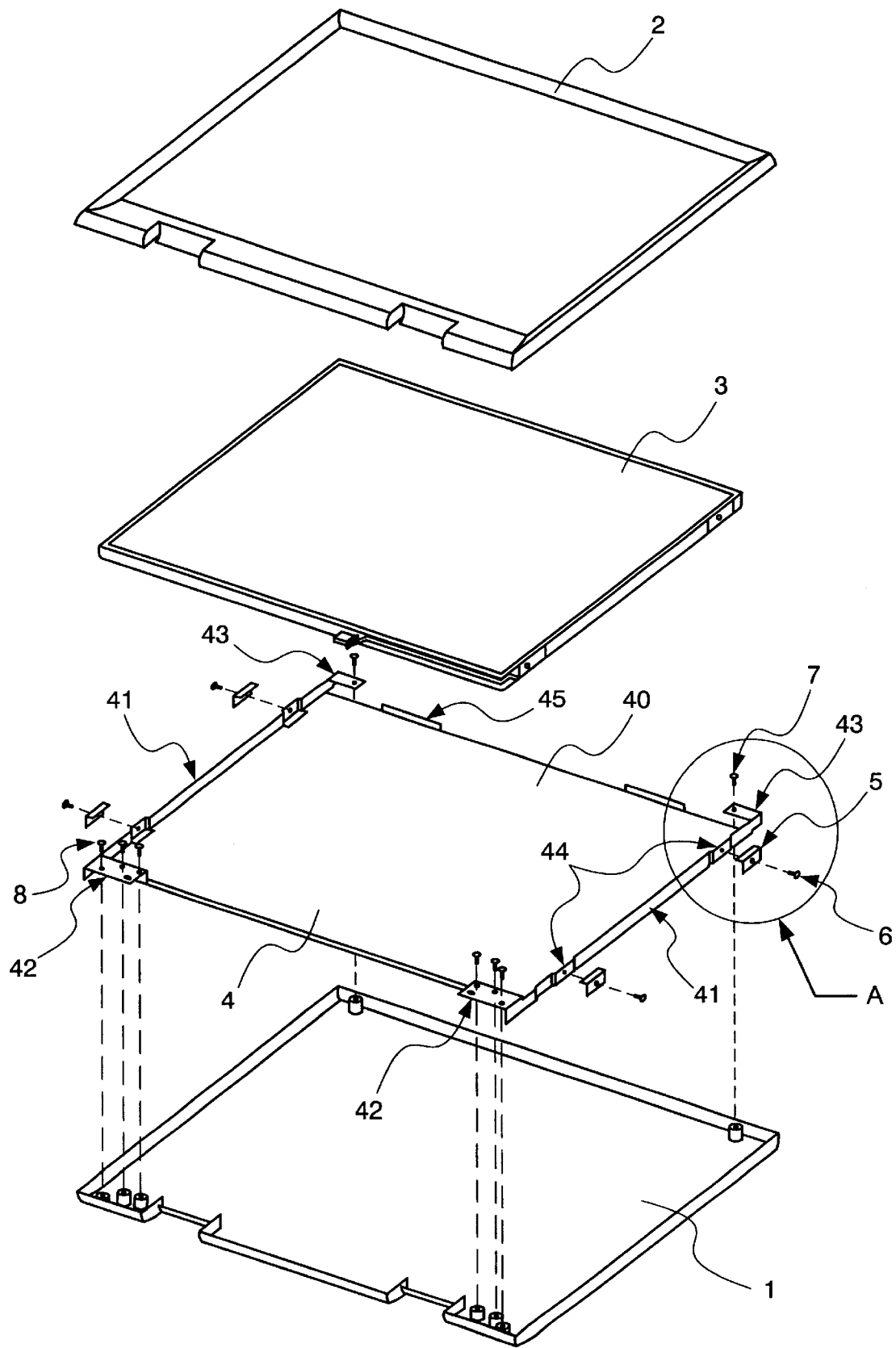
FIG. 1 is an exploded perspective view of a liquid crystal module mounting structure according to a first embodiment of the present invention.

In the following, embodiments of the present invention will be described in detail with reference to the drawings. FIG. 1 is an exploded perspective view for use in explaining a liquid crystal module mounting structure according to the first embodiment of the present invention.

Figure 3:
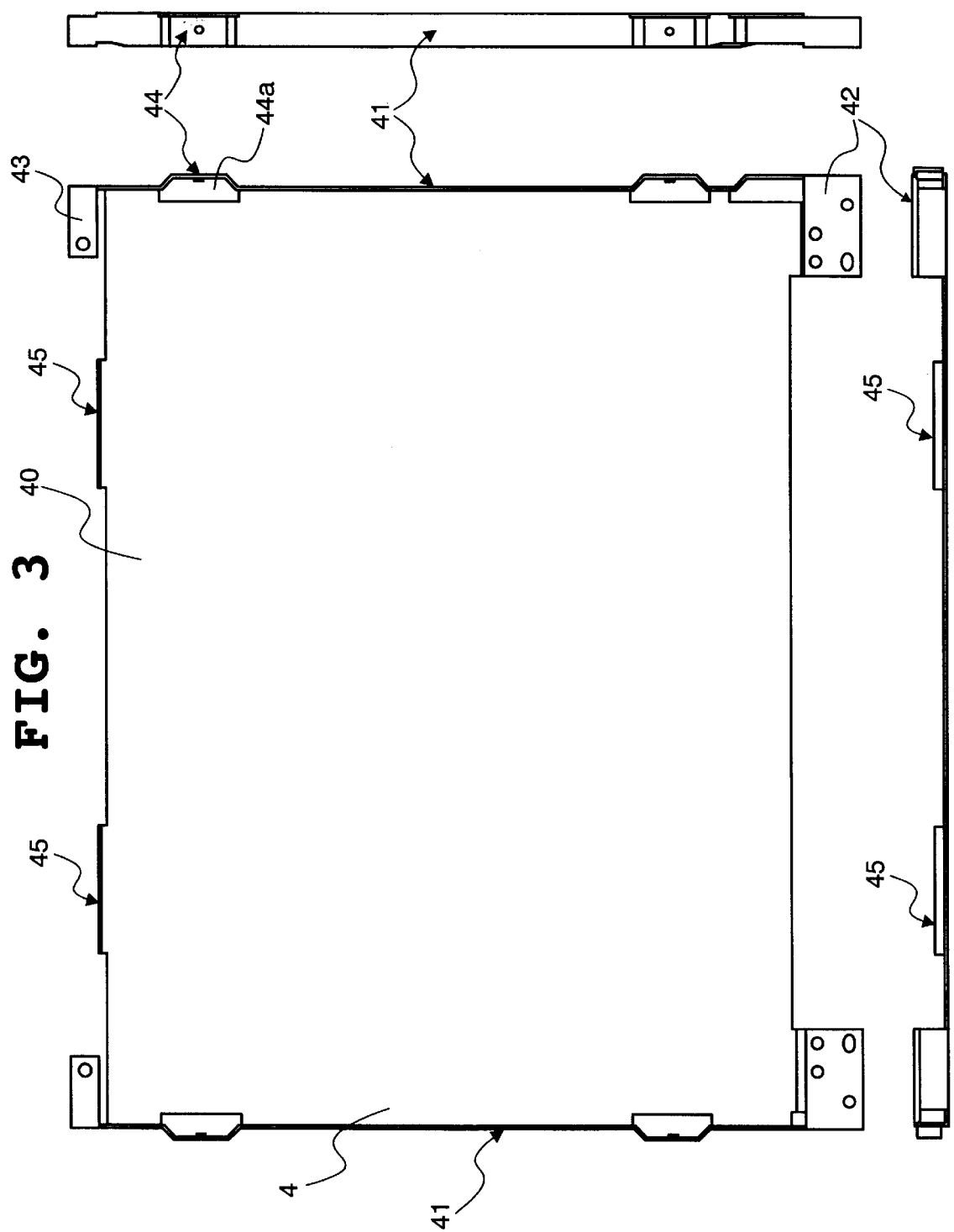
FIG. 3 is a view showing a plane surface and a side surface of a bracket of the first embodiment.

With reference to FIG. 1, the mounting structure according to the first embodiment includes a rear case 1, a bracket 4, an LCD unit 3 and a front case 2. With reference to FIGS. 1 and 3, the bracket 4 is composed of a base plate 40, sidewall parts 41 on the opposite sides and two upper tabs 45.

Each sidewall part 41 includes a lower tab 42, an upper tab 43 and a projection part 44 as an attachment part of a side fixing piece. Provided between the base plate 40 and the projection part 44 is an opening part 44a so as to make the projection part be resilient. In each projection part 44, a screw hole having screw threads therein is formed.

The upper tabs 45 are formed to uprise from the upper end of the base plate 40.

Figure 2:
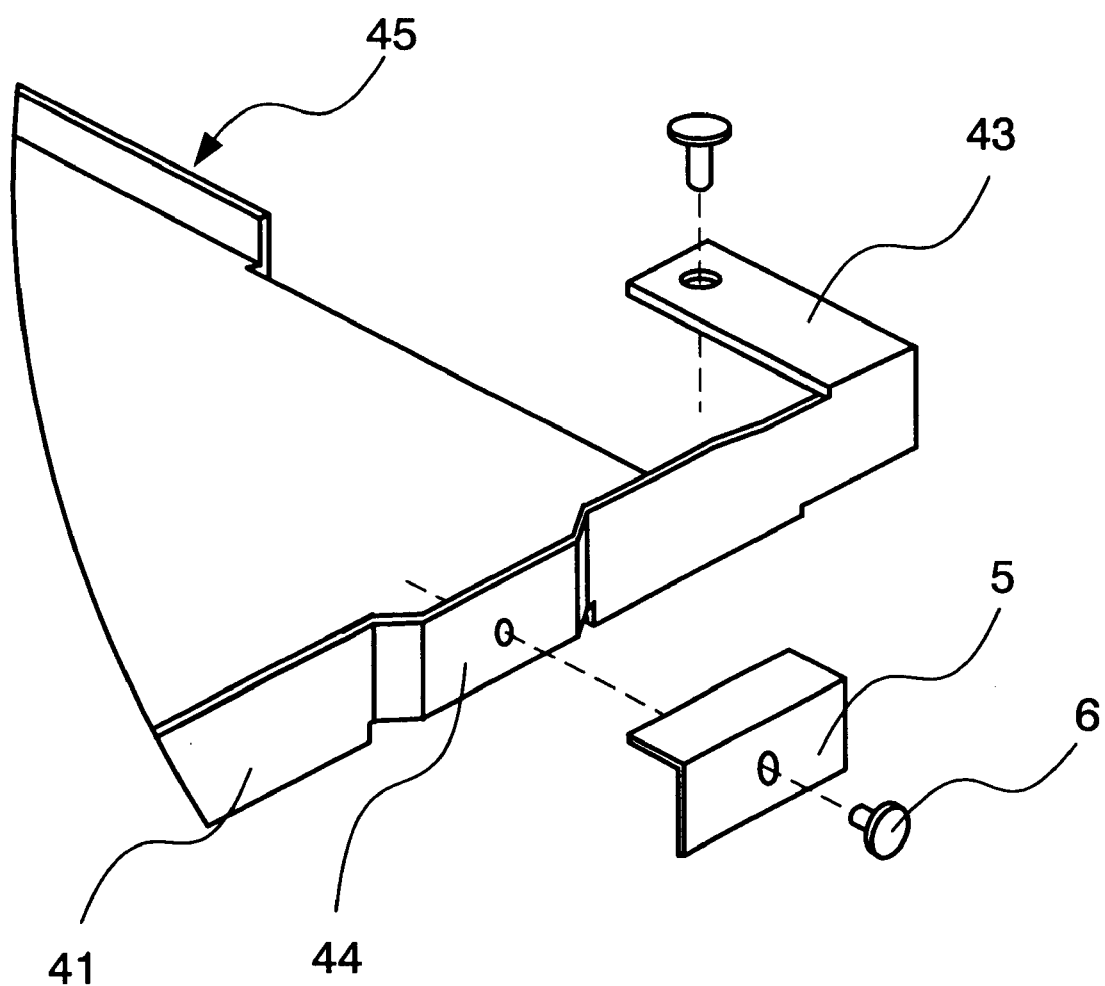
FIG. 2 is a partial expanded view of a part A of FIG. 1.
Figure 4:
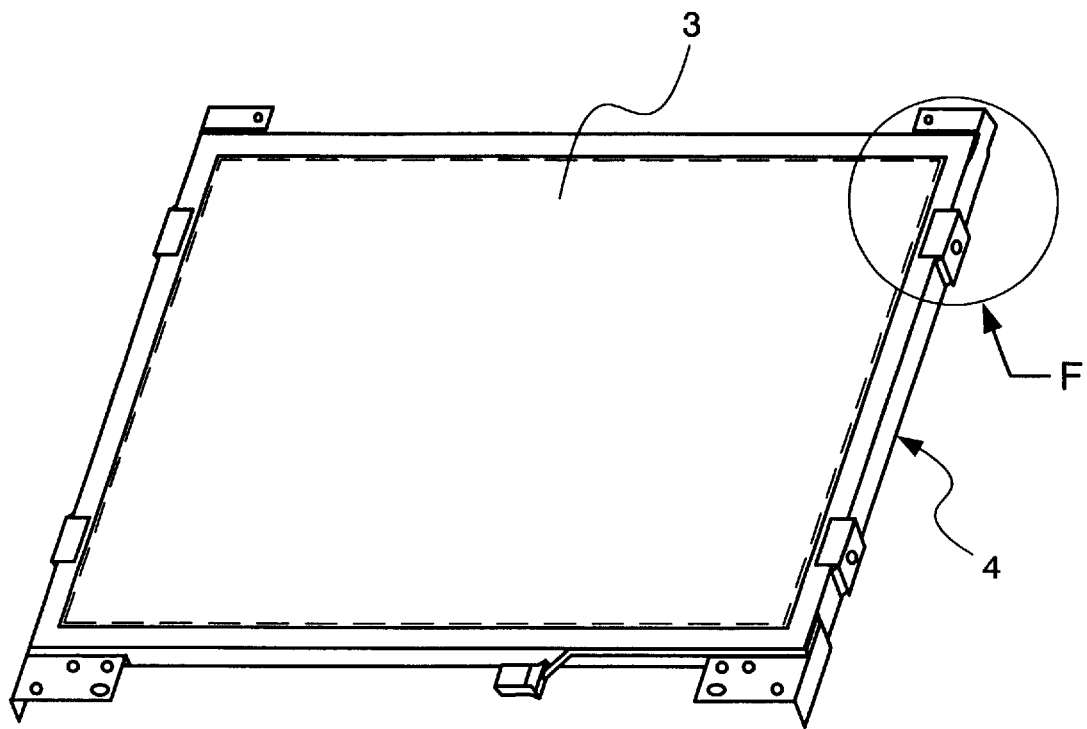
FIG. 4 is a perspective view showing a state where an LCD unit of the first embodiment is housed in the bracket.
Figure 5:
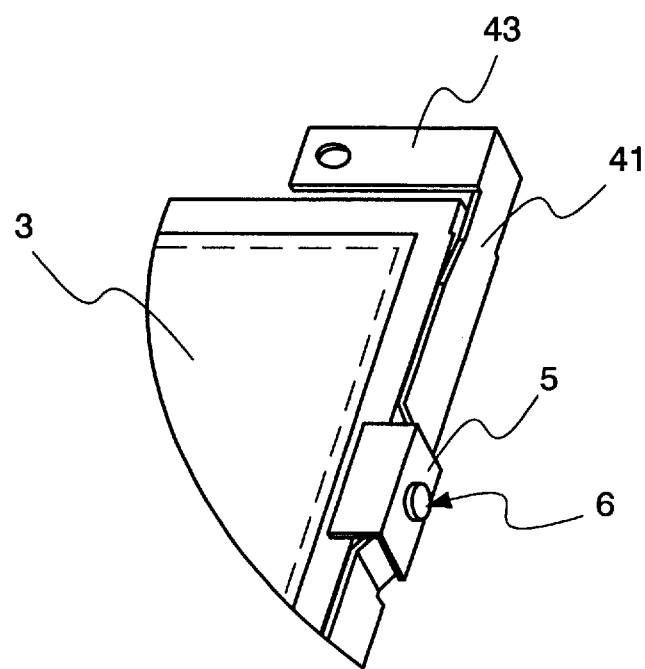
FIG. 5 is a partial expanded view of a part F of FIG. 4.

With reference to FIG. 2 which is an expanded view of the part A of FIG. 1, a side fixing piece 5 whose section is substantially L-shaped is fixed to each projection part 44 by means of a screw 6. As shown in FIG. 5 which is an expanded view of the part F of FIG. 4 as a perspective view of a state where the LCD unit 3 is attached to the bracket 4 and FIG. 7, a peripheral part of a display surface of the LCD unit 3 is firmly installed as a result of the pressing by the side fixing piece 5.

With reference to FIG. 1, the bracket 4 is screwed on the rear case 1 by screws 7 and 8 with the display surface held at an appropriate state by the lower tab 42 and the upper tab 43. As illustrated in the figure, the LCD unit 3 being incorporated into the bracket 4 is attached to the rear case 1.

Figure 6:
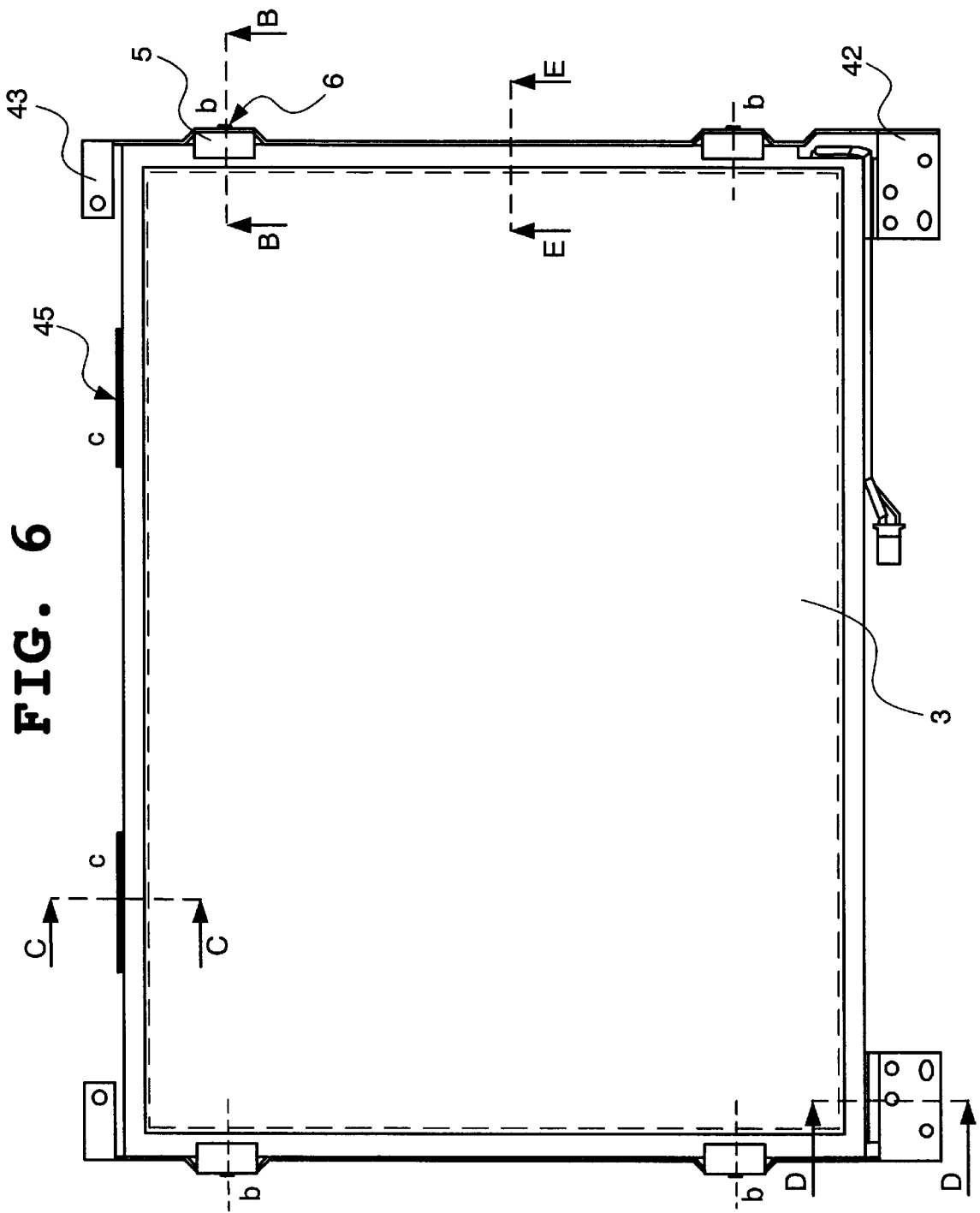
FIG. 6 is a plan view showing a state where the LCD unit of the first embodiment is housed in the bracket.

FIG. 6 is a plan view of the LCD unit 3 appropriately incorporated into the bracket 4. FIGS. 7, 8, 9 and 10 are partial sectional views taken along the lines B—B, C—C, D—D and E—E indicated in FIG. 6, respectively.

Figure 7:
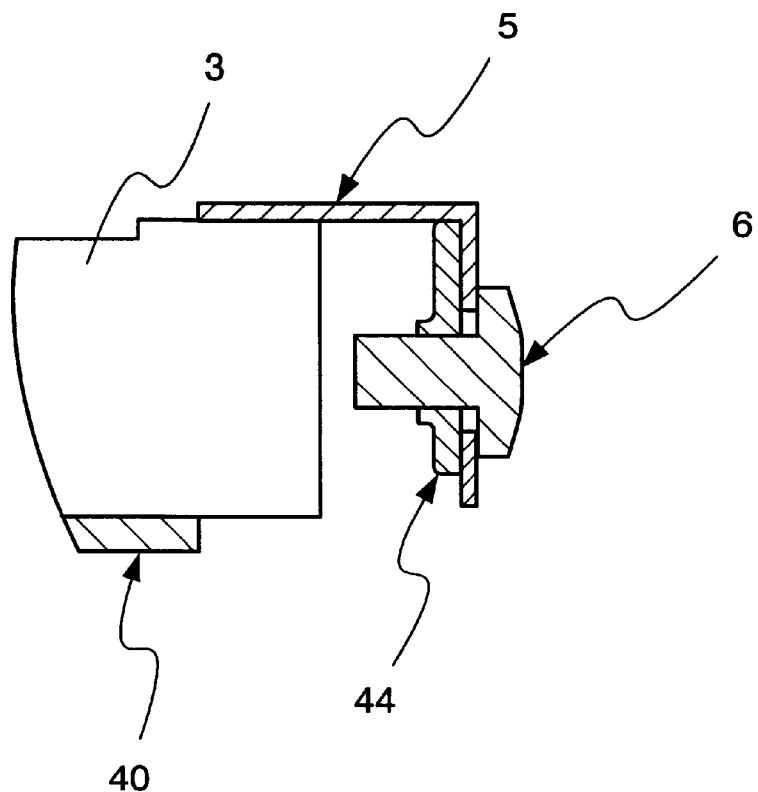
FIG. 7 is an expanded sectional view of a part taken along the line B—B of FIG. 6.

With reference to FIG. 7, the side fixing piece 5 is screwed to the projection part 44 of the bracket 4 by means of the screw 6. As a result, the LCD unit 3 is firmly installed between the side fixing piece 5 and the base plate 40 of the bracket 4.

Figure 8:
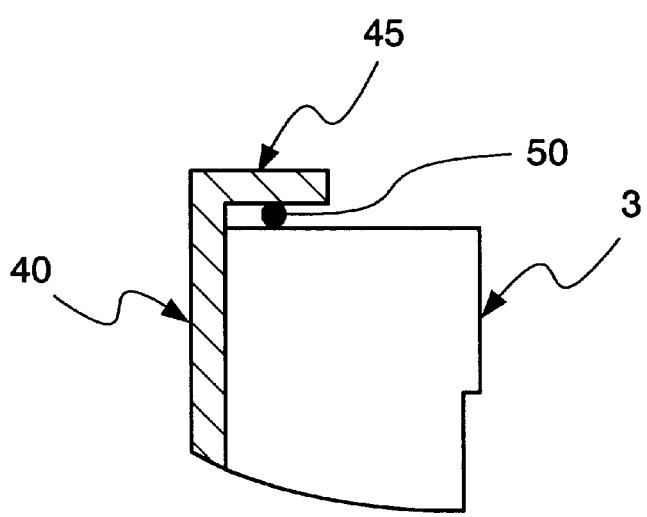
FIG. 8 is an expanded sectional view of a part taken along the line C—C of FIG. 6.
Figure 9:
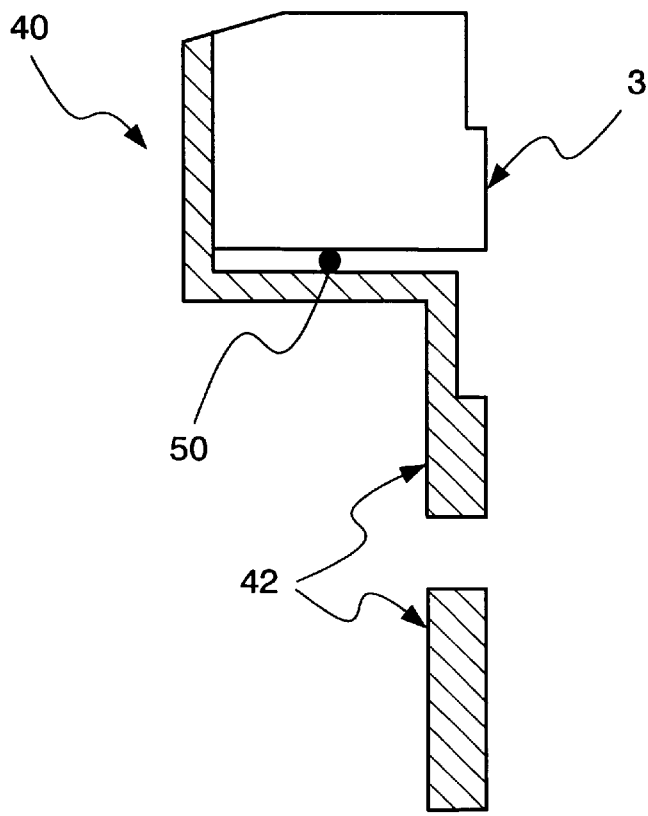
FIG. 9 is an expanded sectional view of a part taken along the line D—D of FIG. 6.
Figure 10:
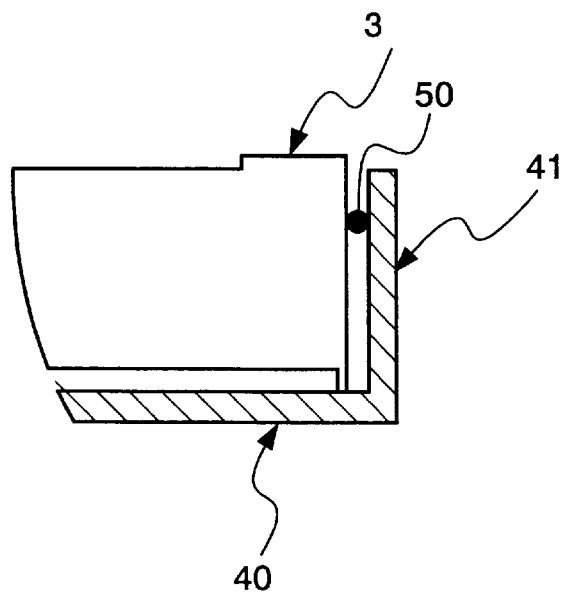
FIG. 10 is an expanded sectional view of a part taken along the line E—E of FIG. 6.

With reference to FIGS. 8, 9 and 10, the LCD unit 3 is fixed to the bracket 4 with its upper and lower and left and right sides held by the upper tab 45 (FIG. 8), the sidewall part 41 (FIG. 10) and the lower tab 42 (FIG. 9) uprising from the base plate 40. When a spacing is generated between the LCD unit 3 and these parts, a cushion member 50 made of an extensible member (e.g. rubber member) is assumed to be provided therebetween as required. When there is no spacing between the LCD unit 3 and these parts, provision of such a cushion member 50 as described above is not necessary.

When the LCD unit 3 is manufactured by a plurality of manufactures to slightly vary in size, in particular, it is possible that a spacing is generated between the side surface of the LCD unit 3 and the sidewall part 41 of the bracket 4, between the side surface of the LCD unit 3 and the upper tab 45 and between the side surface of the LCD unit 3 and the lower tab 42. In such a case, such a cushion member 50 as mentioned above will be provided at the spacing. The back side of the LCD unit 3 is directly attached on the base plate 40 of the bracket 4.

Figure 11:
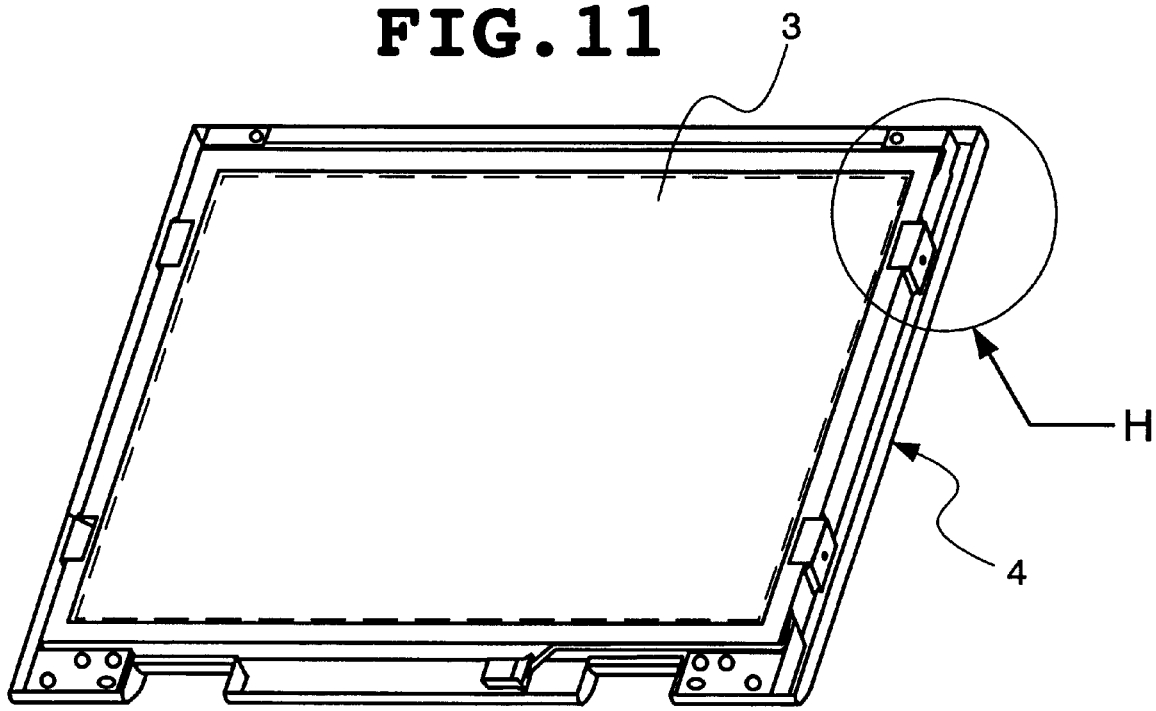
FIG. 11 is a perspective view showing a state where the LCD unit and the bracket of the first embodiment are incorporated into a rear case.
Figure 13:
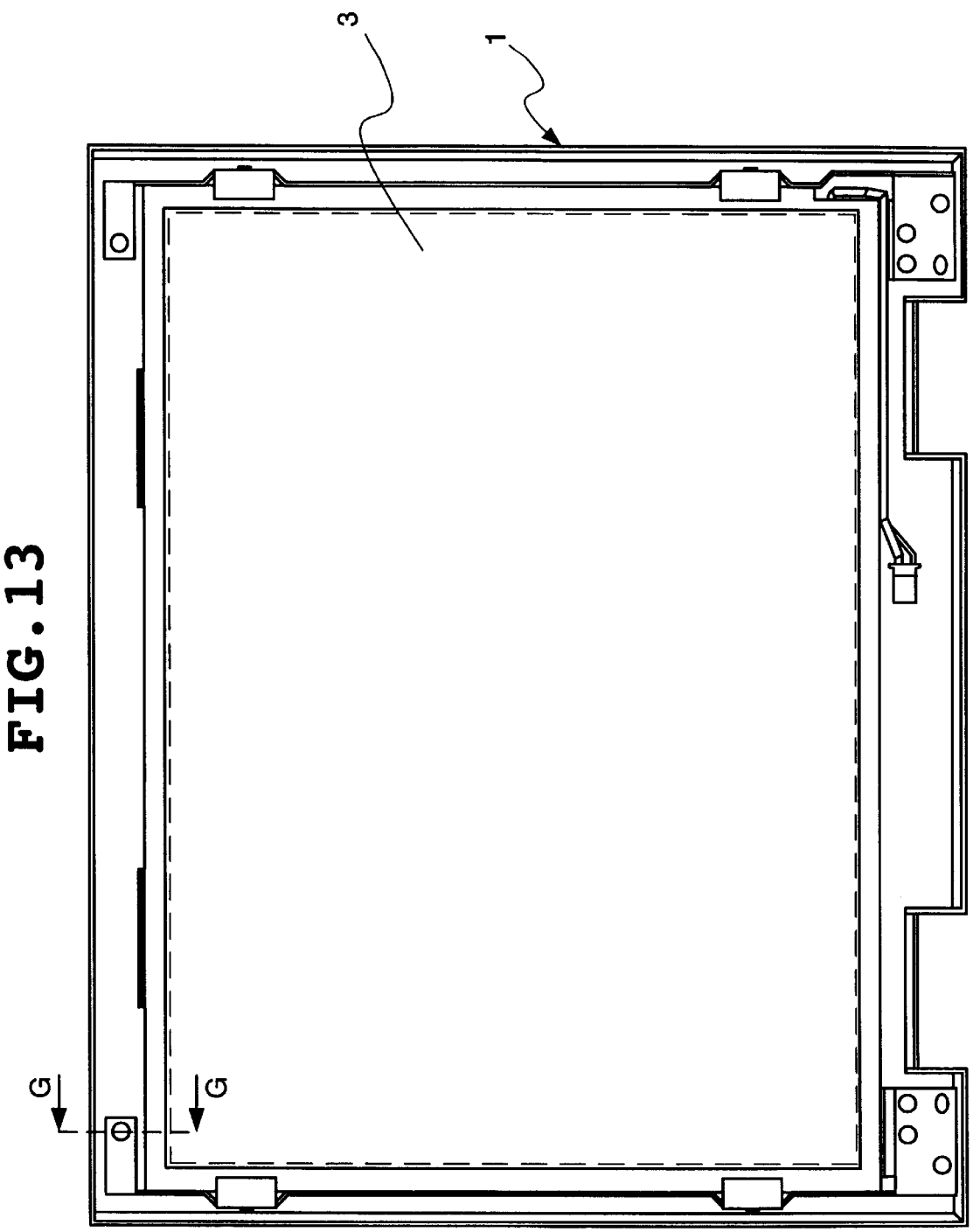
FIG. 13 is a plan view showing a state where the LCD unit and the bracket of the first embodiment are incorporated into the rear case.

As described above, the LCD unit 3 being incorporated into the bracket 4 is mounted on the rear case 1. FIGS. 11 and 13 are a perspective view and a plan view showing a state where the bracket 4 with the LCD unit 3 incorporated therein is mounted on the rear case 1, respectively.

Figure 12:
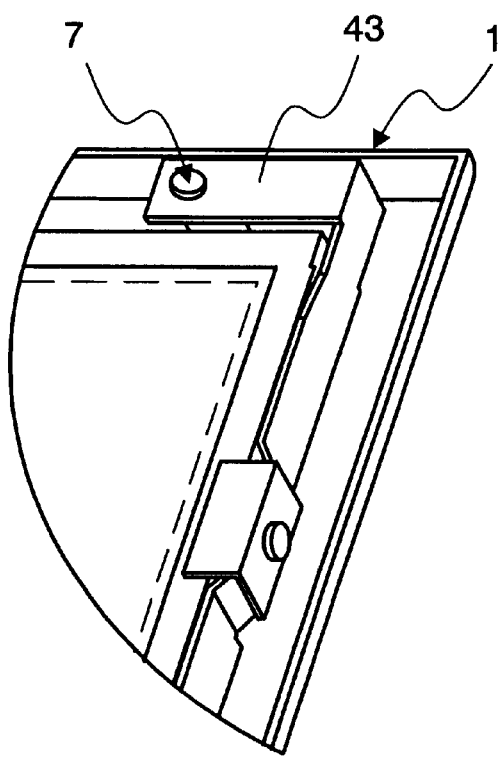
FIG. 12 is a partial expanded view of a part H of FIG. 11.
Figure 14:
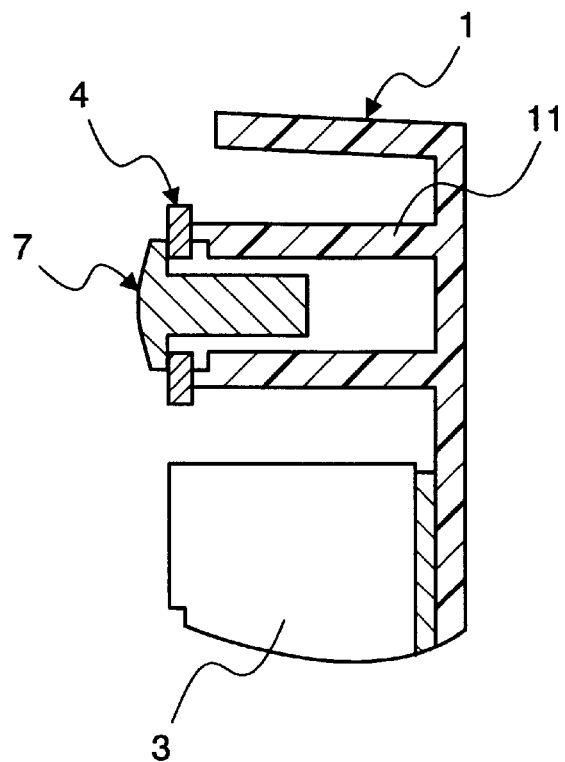
FIG. 14 is an expanded sectional view of a part taken along the line G—G of FIG. 13.

With reference to FIG. 12 which is an expanded view of the part H of FIG. 11, the upper tab 43 of the bracket 4 is screwed to the rear case 1 by means of the screw 7. FIG. 14 is a partial sectional view taken along the line G—G illustrated in FIG. 13. As illustrated in FIG. 14, the rear case 1 includes a boss 11 having screw threads therein at the positions corresponding to the upper tab 43 of the bracket 4. As shown in the figure, screwing the screw 7 into the boss 11 through the hole of the upper tab 43 results in fixing the upper tab 43 to the boss 11.

Also at the positions in the rear case 1 corresponding to the holes (three) of the lower tab 42 of the bracket 4, bosses similar to the boss 11 are provided in the plural (three) and as illustrated in FIG. 1, screwing the three screws 8 into the bosses through the holes of the lower tab 42 results in fixing the lower tab 42 to the rear case 1.

Figure 16:
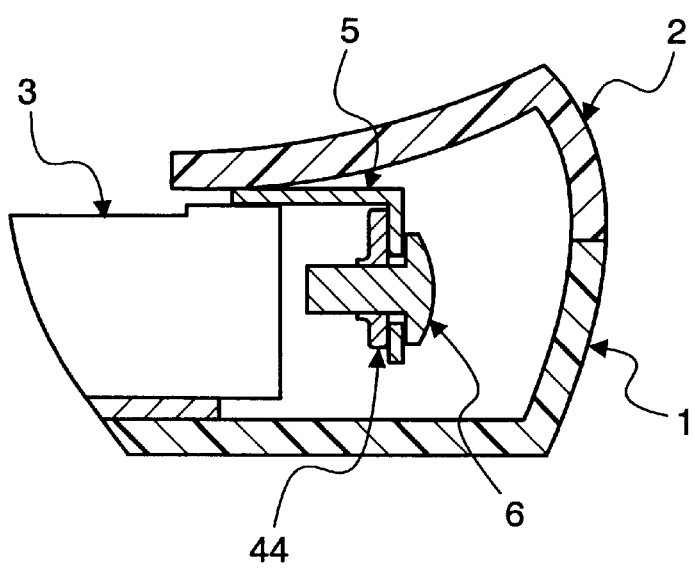
FIG. 16 is an expanded sectional view of a part taken along the line B—B of FIG. 15.
Figure 17:
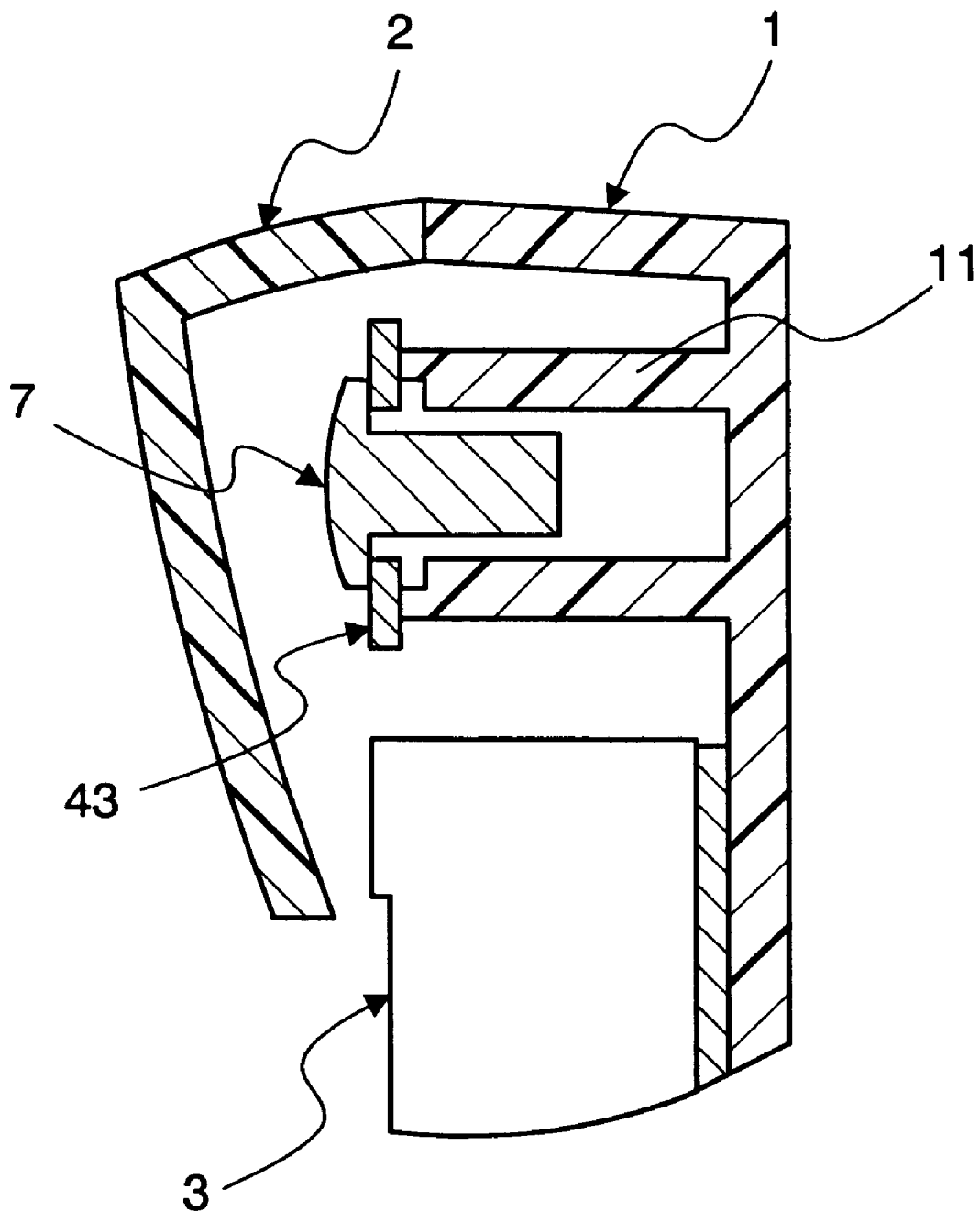
FIG. 17 is an expanded sectional view of a part taken along the line B—B of FIG. 15.

FIG. 15 is a plan view showing a state where after the bracket 4 with the LCD unit 3 incorporated therein is mounted on the rear case 1, the front side is covered with the front case 2. FIGS. 16 and 17 show partial sectional views taken along the lines B—B and G—G indicated in FIG. 15, respectively. As illustrated in FIGS. 16 and 17, the side fixing piece 5, the projection part 44, the screw 6 (FIG. 16), the upper tab 43, the screw 7 and the boss 11 (FIG. 17) are covered by the front case 2.

Figure 18:
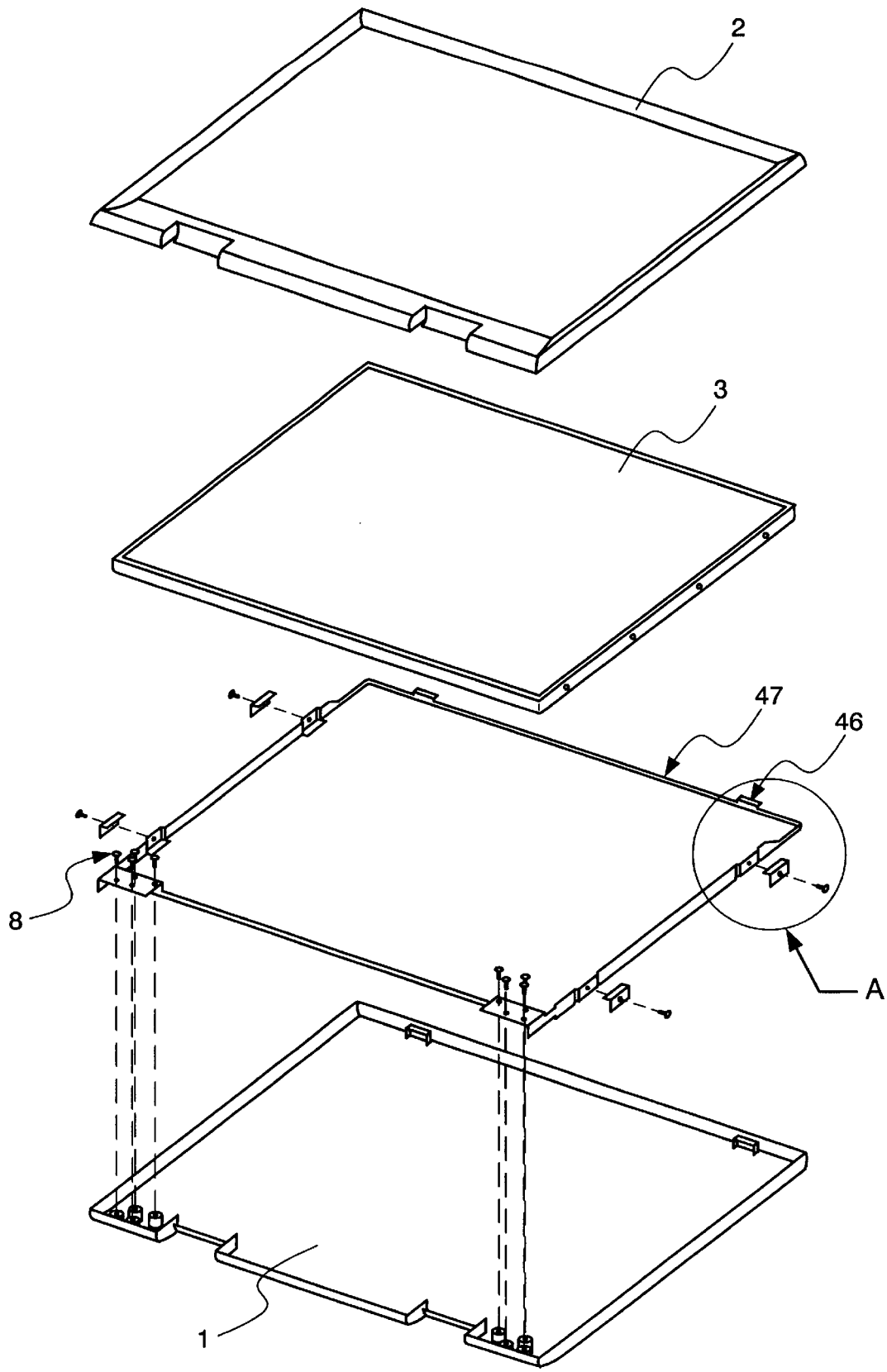
FIG. 18 is an exploded perspective view of a liquid crystal module mounting structure according to a second embodiment of the present invention.

Next, a liquid crystal module mounting structure according to the second embodiment of the present invention will be described. FIG. 18 is an exploded perspective view for use in explaining the liquid crystal module mounting structure according to the second embodiment of the present invention.

The difference from the above-described first embodiment is that the second embodiment includes a new fixing structure in place of the upper tab 43, the boss 11 and the screw 7. In a case where a spacing between the LCD unit 3 and the rear case 1 is too small on the upper side to have the boss 11 for screwing by the screw 7 on the rear case 1, the fixing structure according to the present embodiment will be applied.

Figure 19:
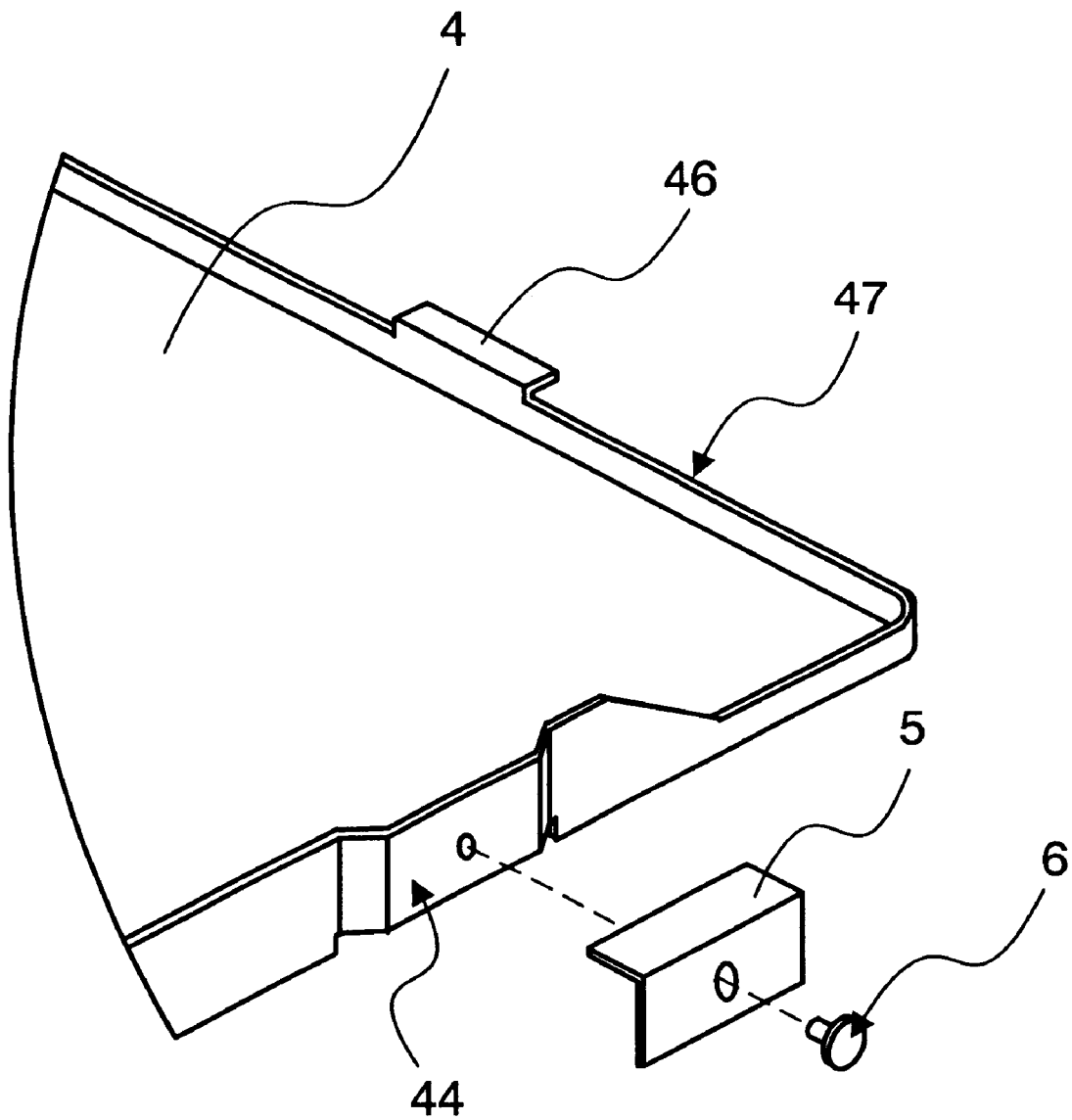
FIG. 19 is a partial expanded view of a part A of FIG. 18.
Figure 20:
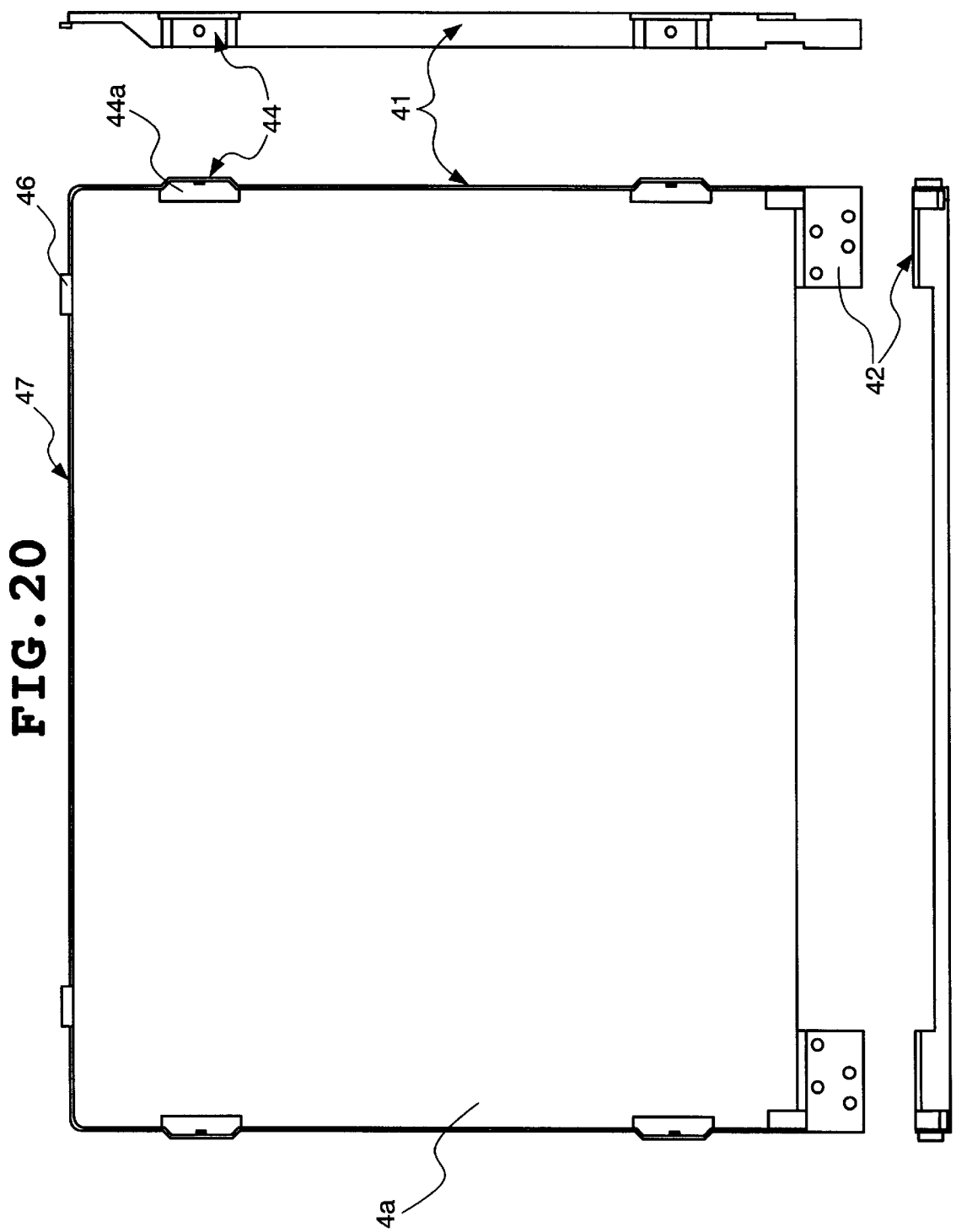
FIG. 20 is a view showing a plane surface and a side surface of a bracket of the second embodiment.

With reference to FIGS. 18, 19 and 20, the bracket 4 includes, in place of the upper tab 43 and the upper tab 45 of the first embodiment, an upper wall part 47 uprising from the upper end of the bracket 4 and an upper tab 46 externally projecting from the upper wall part 47. Differently from the upper tab 43 of the first embodiment, the upper tab 46 has no hole for screwing.

Figure 21:
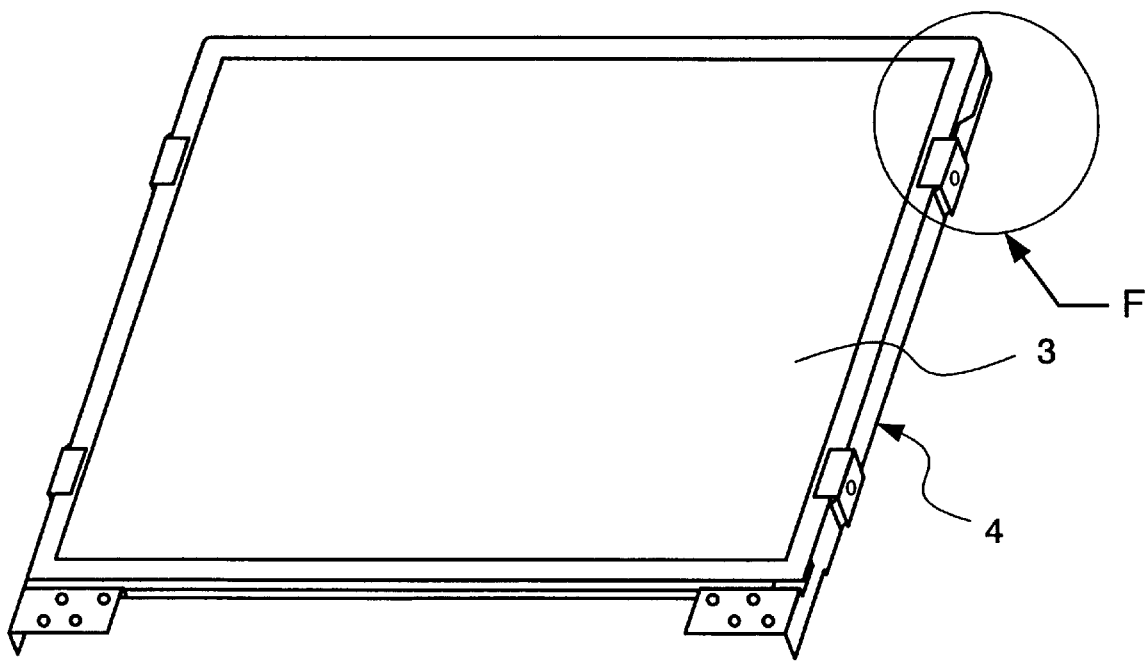
FIG. 21 is a perspective view showing a state where an LCD unit of the second embodiment is housed in the bracket.
Figure 22:
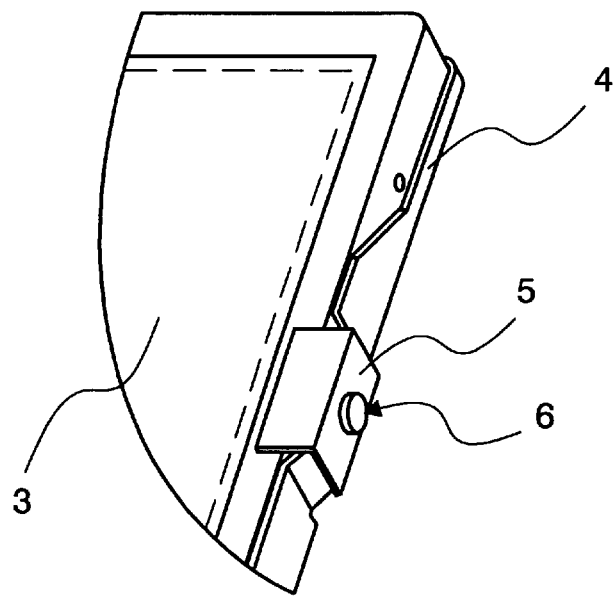
FIG. 22 is a partial expanded view of a part F of FIG. 21.

With reference to FIG. 19 which is an expanded view of the part A of FIG. 18 and FIG. 22 which is an expanded view of the part F of FIG. 21 as a perspective view of a state where the LCD unit 3 is attached to the bracket 4, that the side fixing piece 5 is attached to each projection part 44 of the bracket 4 by means of the screw 6 is the same as that in the first embodiment.

With reference to FIG. 18, the bracket 4 is screwed to the rear case 1 with the display surface held at an appropriate state by the lower tab 42 and the upper tab 46. As illustrated in the figure, the LCD unit 3 being incorporated into the bracket 4 is mounted on the rear case 1.

Figure 23:
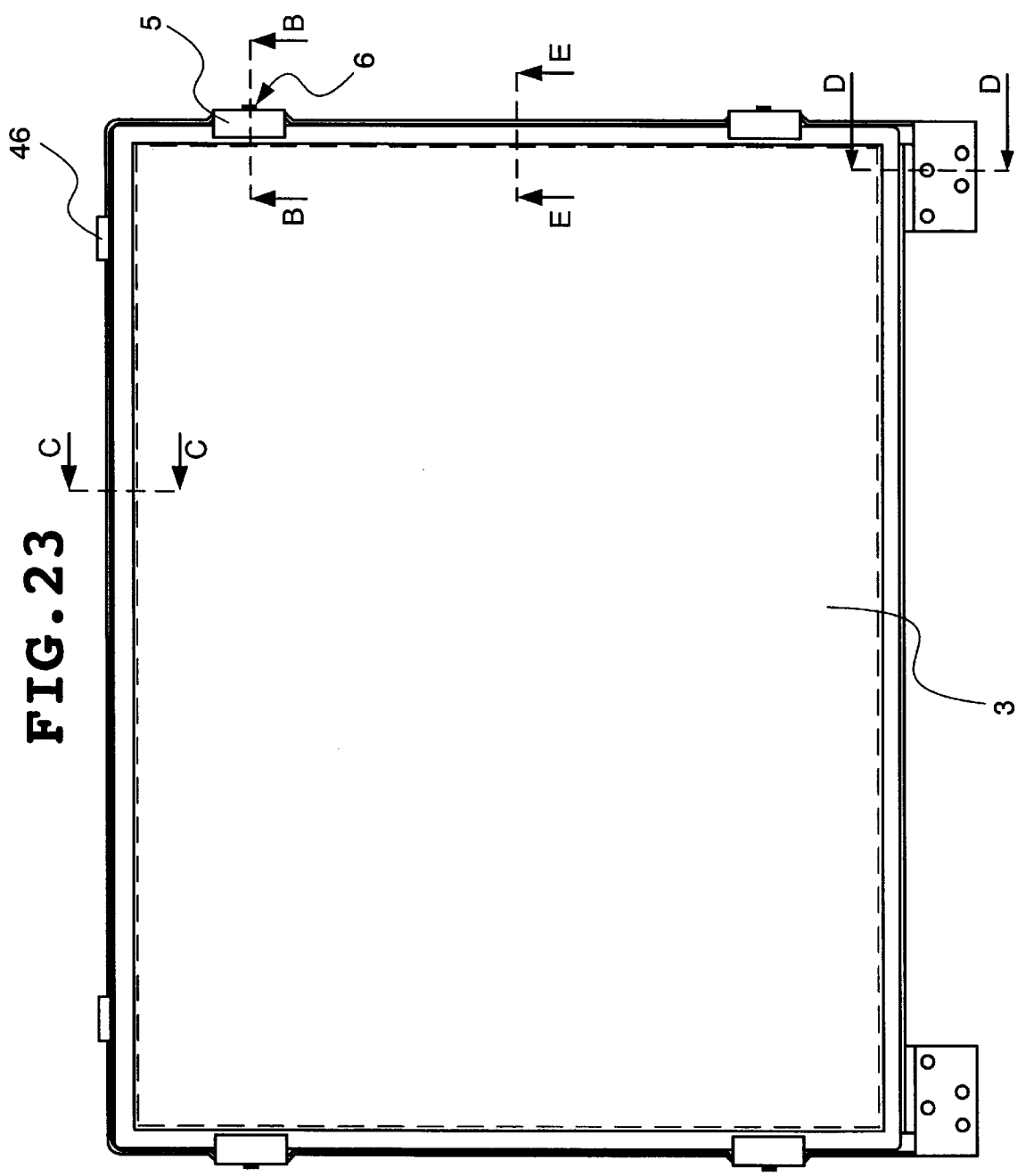
FIG. 23 is a plan view showing a state where the LCD unit of the second embodiment is housed in the bracket.

FIG. 23 is a plan view of the LCD unit 3 appropriately incorporated into the bracket 4. FIGS. 24, 25, 26 and 27 are partial sectional views taken along the lines B—B, C—C, D—D and E—E illustrated in FIG. 23, respectively.

Figure 24:
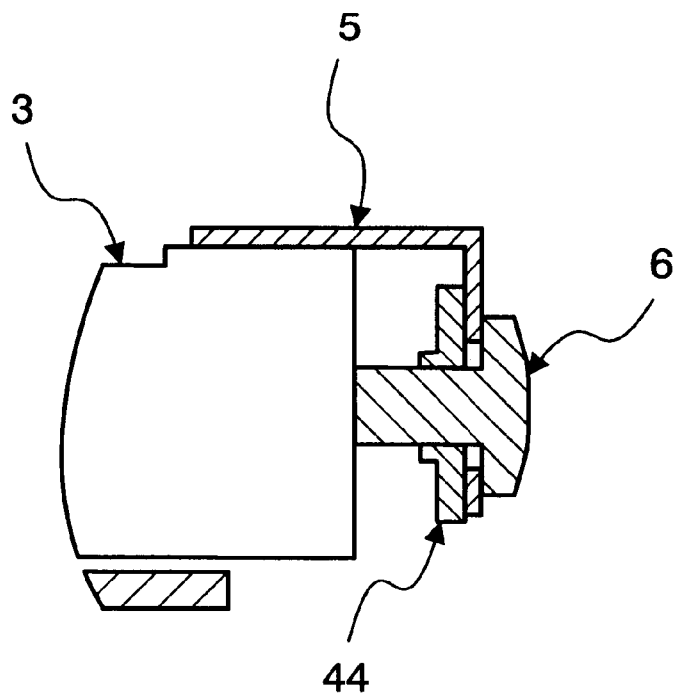
FIG. 24 is an expanded sectional view of a part taken along the line B—B of FIG. 23.

With reference to FIG. 24, the side fixing piece 5 is screwed to the projection part 44 of the bracket 4 by means of the screw 6. As a result, the LCD unit 3 is firmly installed between the side fixing piece 5 and the base plate 40 of the bracket 4.

Figure 25:
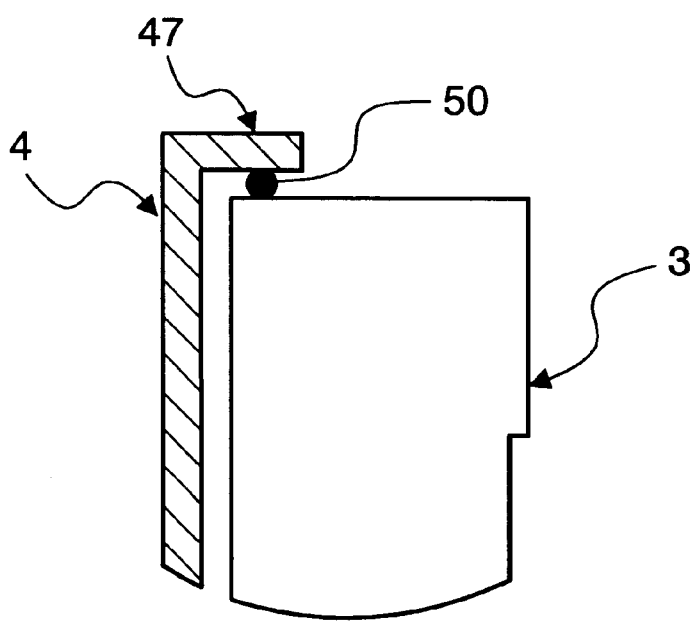
FIG. 25 is an expanded sectional view of a part taken along the line C—C of FIG. 23.
Figure 26:
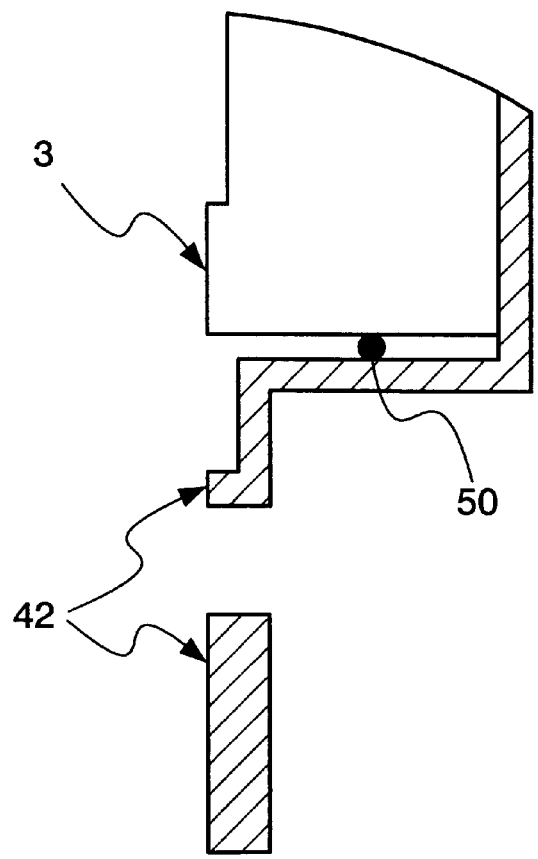
FIG. 26 is an expanded sectional view of a part taken along the line D—D of FIG. 23.
Figure 27:
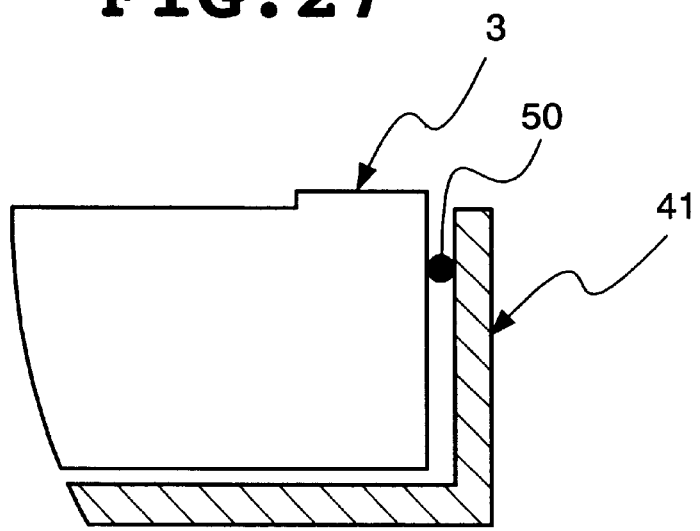
FIG. 27 is an expanded sectional view of a part taken along the line E—E of FIG. 23.

With reference to FIGS. 25, 26 and 27, the LCD unit 3 is incorporated into the bracket 4 with its upper and lower and left and right sides held by the upper wall part 47 (FIG. 25), the sidewall part 41 (FIG. 27) and the lower tab 42 (FIG. 26) uprising from the base plate 40.

When a spacing is generated between the LCD unit 3 and these parts, the cushion member 50 made of an extensible member (rubber member) is assumed to be provided therebetween as required. When there is no spacing between the LCD unit 3 and these parts, provision of such a cushion member 50 as described above is not necessary.

When the LCD unit 3 is manufactured by a plurality of manufactures to slightly vary in size, in particular, it is possible that a spacing is generated between the side surface of the LCD unit 3 and the sidewall part 41 of the bracket 4, between the side surface of the LCD unit 3 and the upper tab 45 and between the side surface of the LCD unit 3 and the lower tab 42. In such a case, such a cushion member 50 as mentioned above will be provided at the spacing. The back side of the LCD unit 3 is directly attached on the base plate 40 of the bracket 4.

Figure 28:
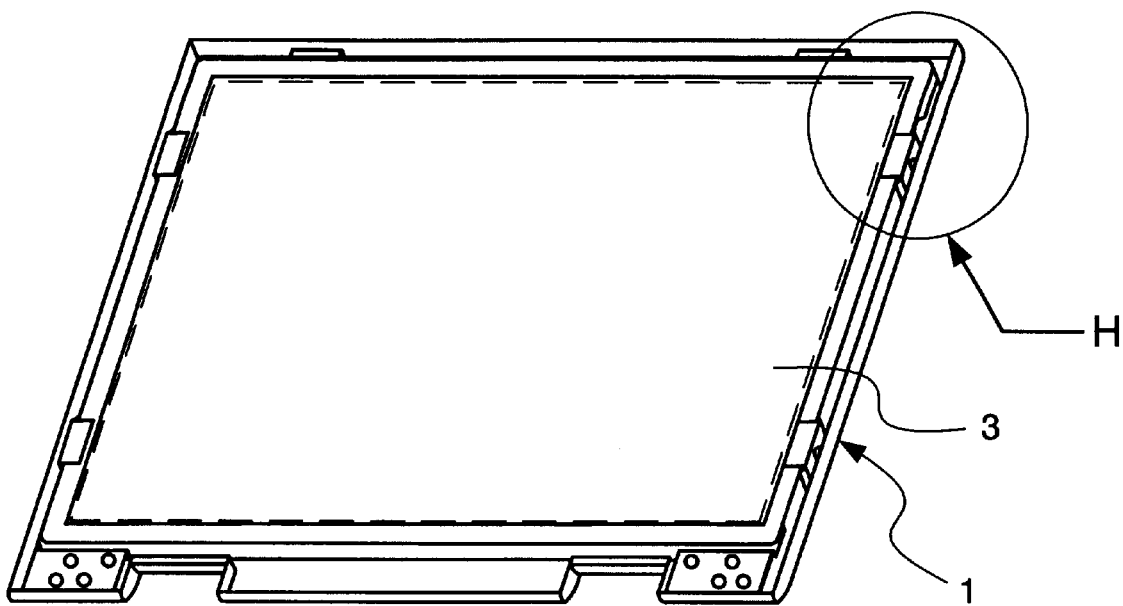
FIG. 28 is a perspective view showing the state where the LCD unit and the bracket of the second embodiment are incorporated into a rear case.
Figure 29:
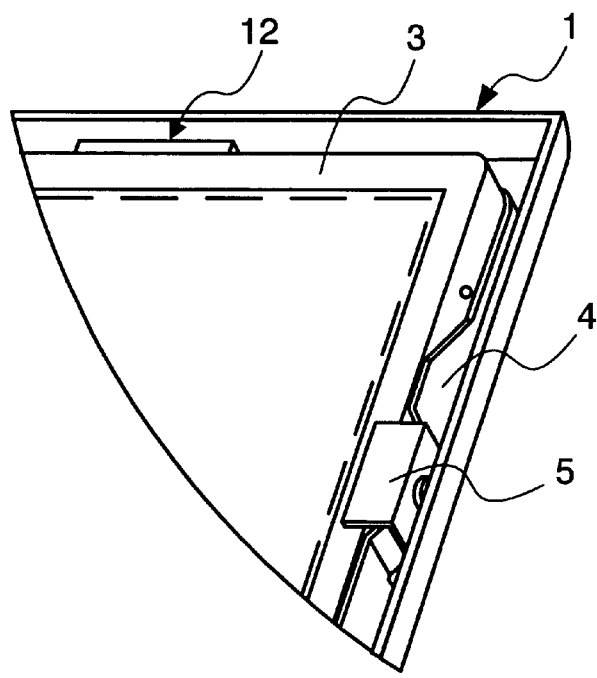
FIG. 29 is a partial expanded view of a part H of FIG. 28.
Figure 30:
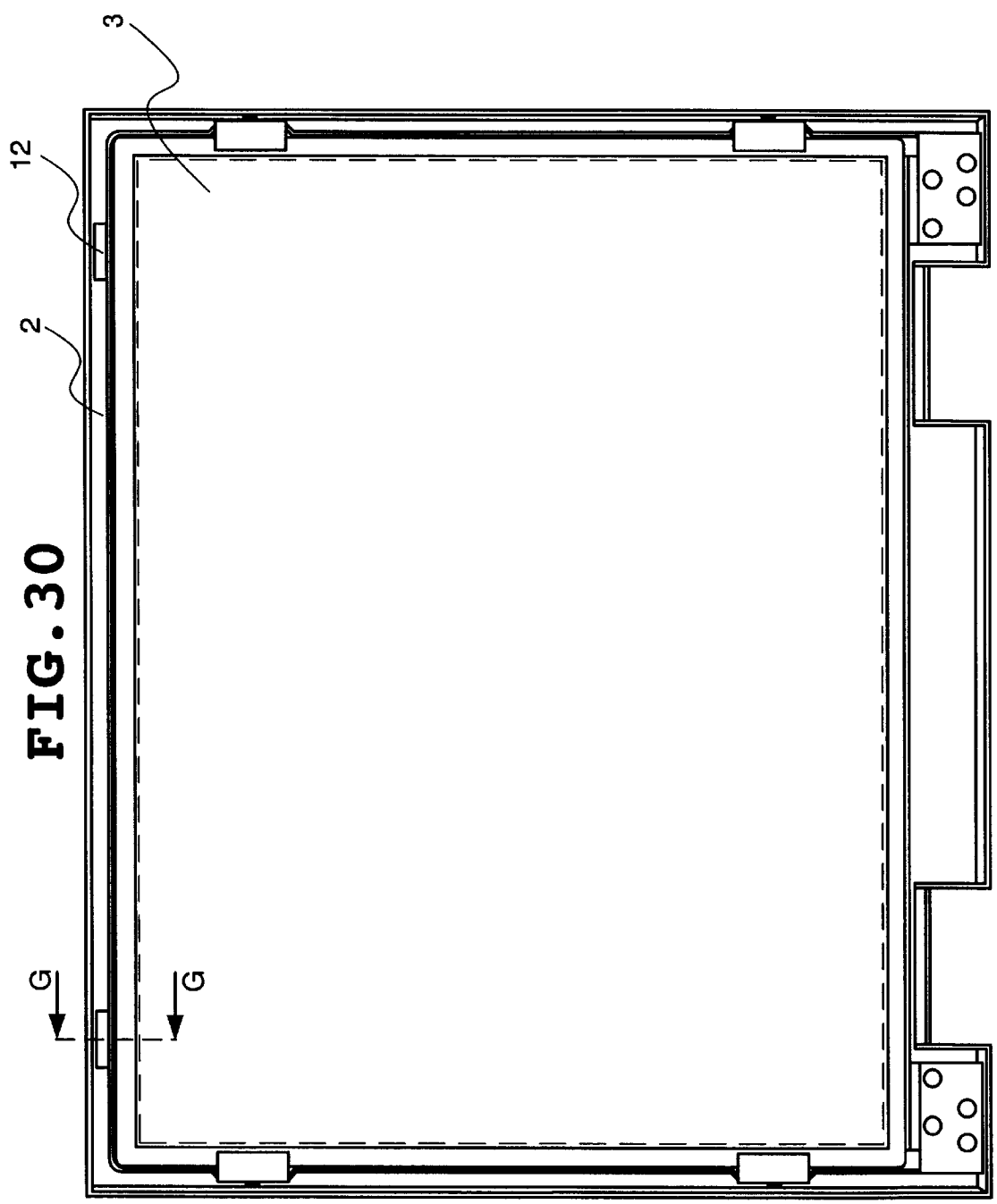
FIG. 30 is a plan view showing a state where the LCD unit and the bracket of the second embodiment are incorporated into the rear case.

As described above, the LCD unit 3 being incorporated into the bracket 4 is mounted on the rear case 1. FIGS. 28 and 30 are a perspective view and a plan view showing a state where the bracket 4 with the LCD unit 3 incorporated therein is mounted on the rear case 1, respectively.

Figure 31:
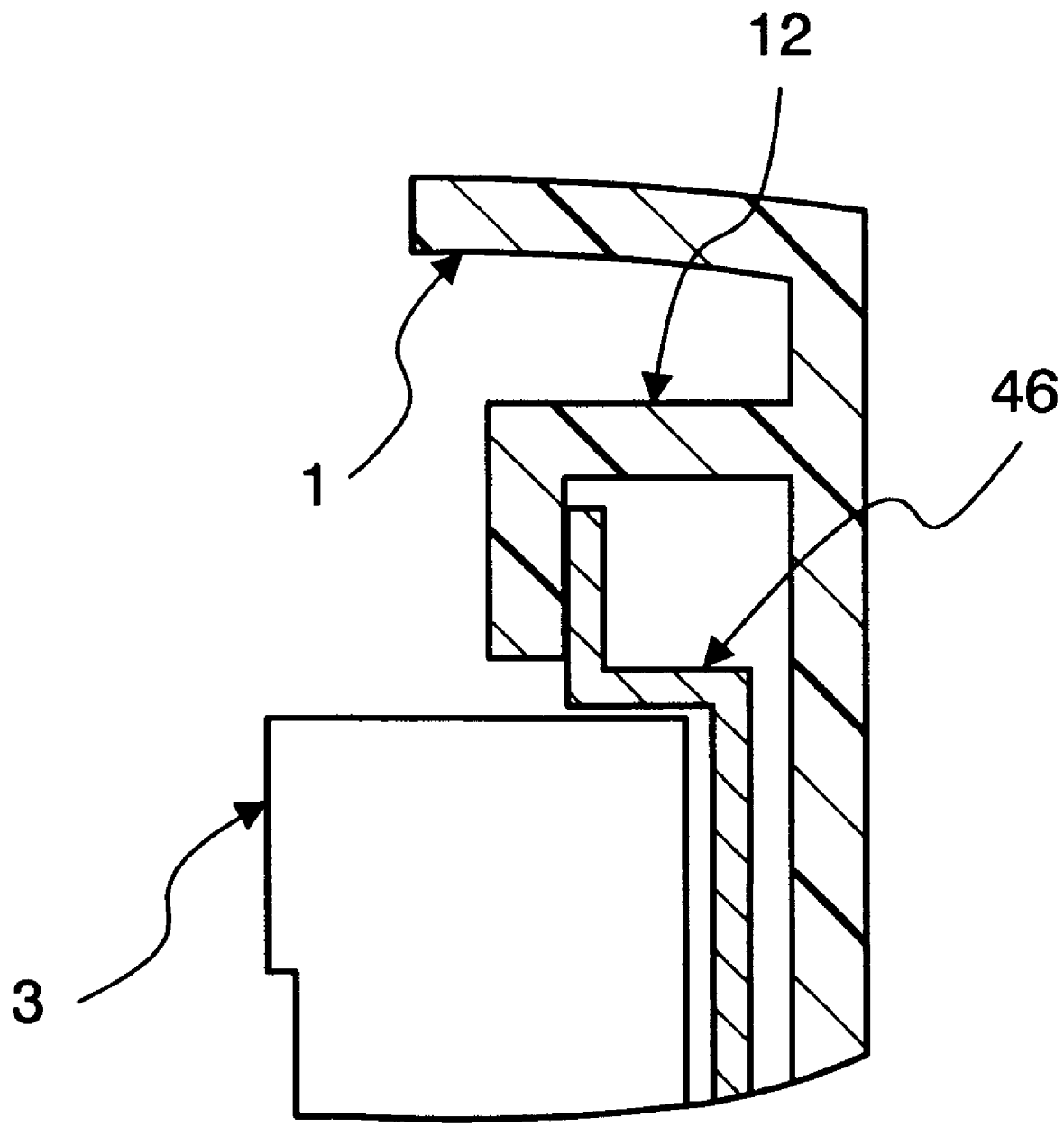
FIG. 31 is an expanded sectional view of a part taken along the line G—G of FIG. 30.

FIG. 30 is a plan view of the LCD unit 3 and the bracket 4 mounted on the rear case 1. FIG. 31 is a partial sectional view taken along the line G—G shown in FIG. 30. With reference to FIG. 31, the rear case 1 has a holder part 12 whose section is L-shaped provided at a position corresponding to the upper tab 46 of the bracket 4.

The holder part 12 is integrally formed to uprise from the bottom surface of the rear case 1 at a position spaced apart from the upper sidewall of the rear case 1 and is formed into a pocket whose section is L-shaped allowing insertion of the upper tab 46 of the bracket 4. The width of the holder part 12 is approximately equal to that of the upper tab 46.

Insertion of the upper tab 46 of the bracket 4 into the holder 12 results in the upper part of the bracket 4 being held to the rear case 1.

In addition, that in the rear case 1, the lower tab 42 of the bracket 4 is screwed to the rear case 1 by the screw 8 is the same as that in the first embodiment.

In the second embodiment, the upper tab 46 and the holder part 12 are neither screwed nor adhered as mentioned above. The upper tab 46 is attached only through insertion into the holder part 12.

Figure 32:
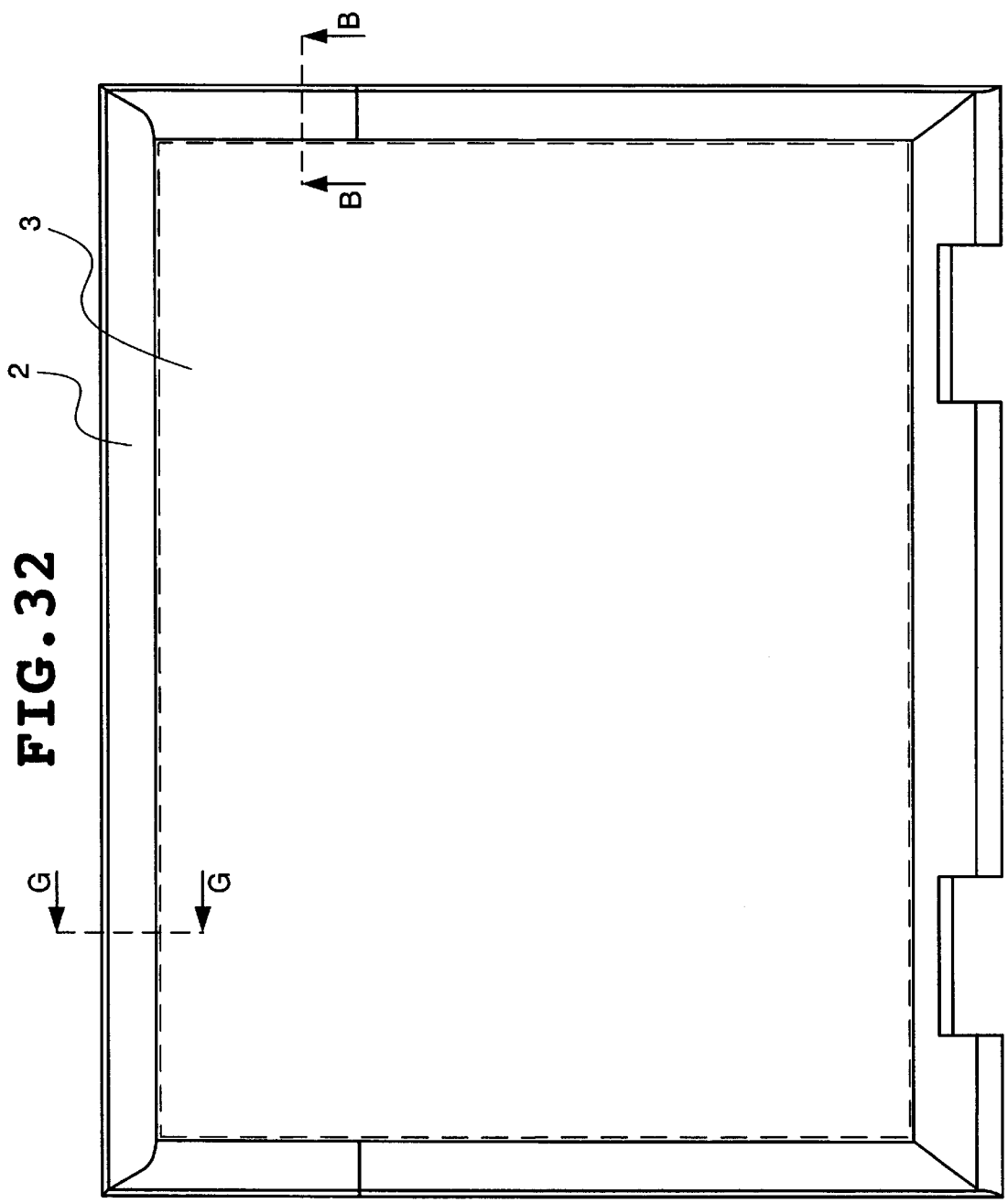
FIG. 32 is a plan view of a state where a front case of the second embodiment is mounted.
Figure 33:
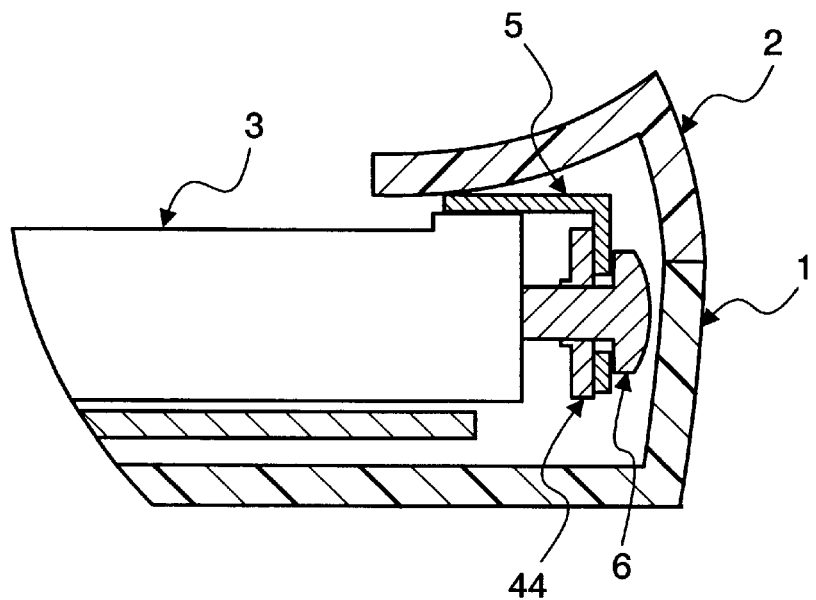
FIG. 33 is an expanded sectional view of a part taken along the line B—B of FIG. 32.
Figure 34:
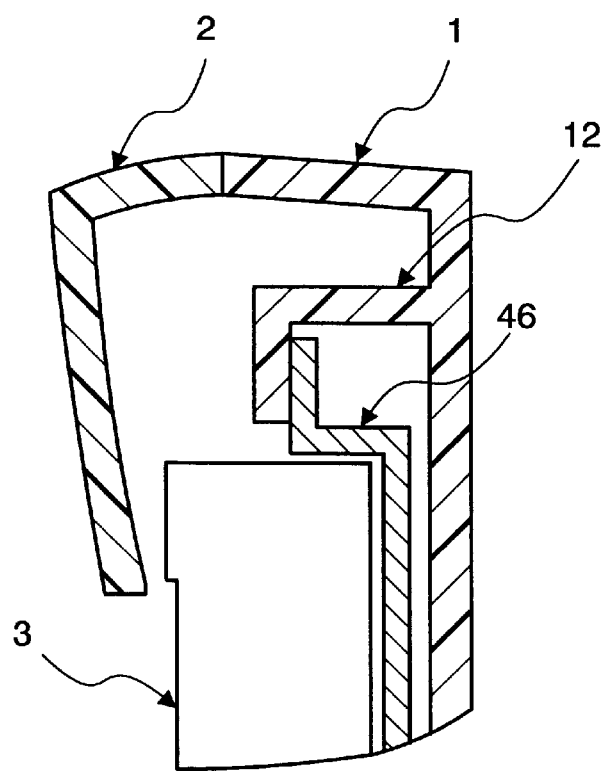
FIG. 34 is an expanded sectional view of a part taken along the line G—G of FIG. 32.

FIG. 32 is a plan view showing a state where after the bracket 4 with the LCD unit 3 incorporated therein is mounted on the rear case 1, the front side is covered with the front case 2. FIGS. 33 and 34 show partial sectional views taken along the lines B—B and G—G indicated in FIG. 32, respectively. As illustrated in FIGS. 33 and 34, the side fixing piece 5, the projection part 44, the screw 6 (FIG. 33), the upper tab 46, and the holder part 12 (FIG. 34) are covered by the front case 2.

Figure 35:
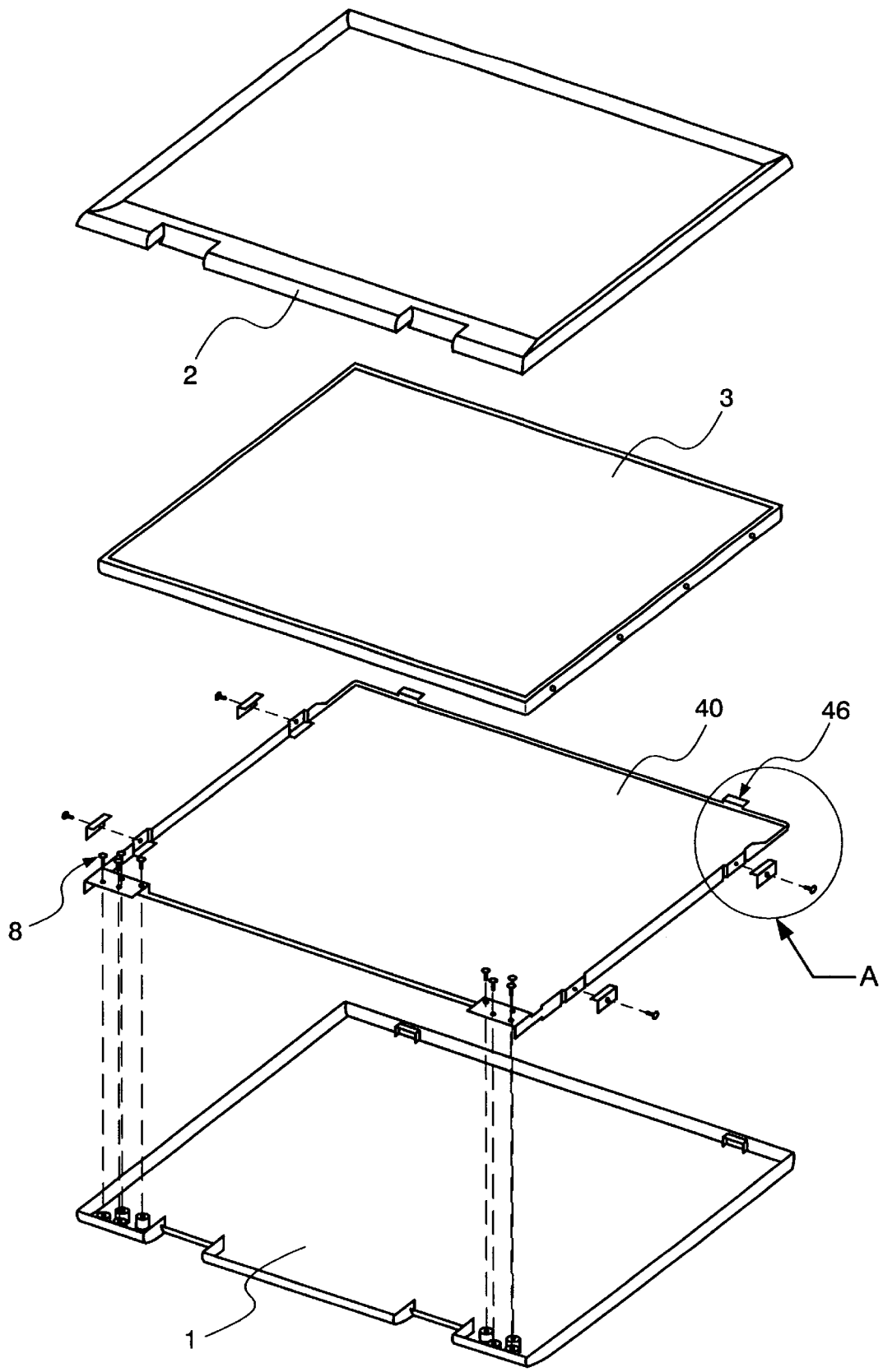
FIG. 35 is an exploded perspective view of a liquid crystal module mounting structure according to a third embodiment of the present invention.

Next, a liquid crystal module mounting structure according to the third embodiment of the present invention will be described. FIG. 35 is an exploded perspective view for use in explaining the liquid crystal module mounting structure according to the third embodiment of the present invention.

The third embodiment is a modification of the above-described structure according to the second embodiment and while the L-shaped holder 12 in the second embodiment is formed to uprise from the bottom part of the rear case 1, a holder 13 in the present embodiment is formed directly at the sidewall part of the rear case 1. Thus formed holder part 13 on the sidewall of the rear case 1 enables the upper tab 46 of the bracket 4 to be inserted and held even when a spacing between the LCD unit 3 and the sidewall of the rear case 1 is too small on the upper side to form the L-shaped holder part 12.

Figure 48:
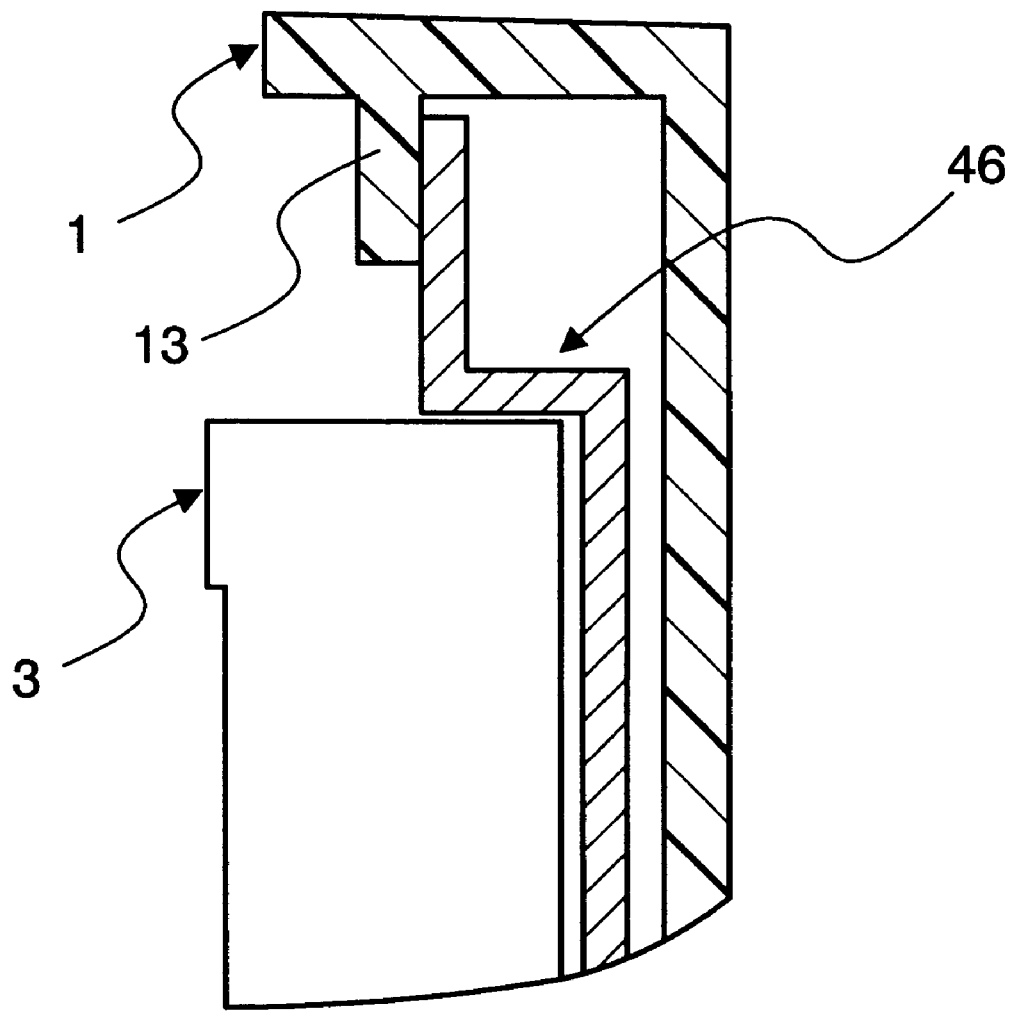
FIG. 48 is an expanded sectional view of a part taken along the line G—G of FIG. 47.

With reference to FIG. 48, the rear case 1 includes the holder part 13 in place of the L-shaped holder part 12 shown in the second embodiment. The holder part 13 is integrally formed on the upper sidewall of the rear case 1 and formed into a pocket whose section is L-shaped allowing insertion of the upper tab 46 of the bracket 4. The width of the holder part 13 is approximately equal to that of the upper tab 46.

For attaching the bracket 4 to the rear case 1, the upper tab 46 of the bracket 4 is inserted into the holder part 13.

Figure 36:
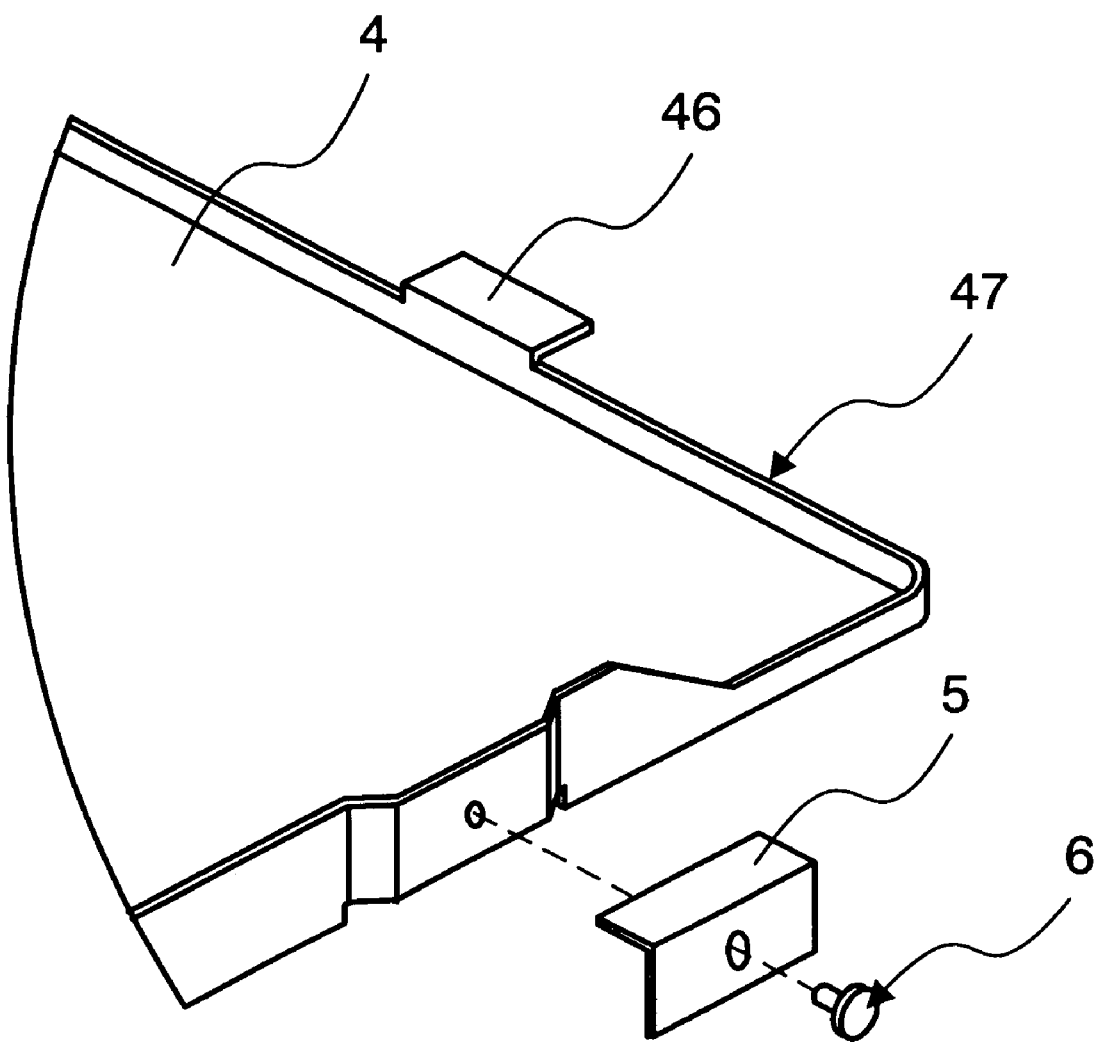
FIG. 36 is a partial expanded view of a part A of FIG. 35.
Figure 37:
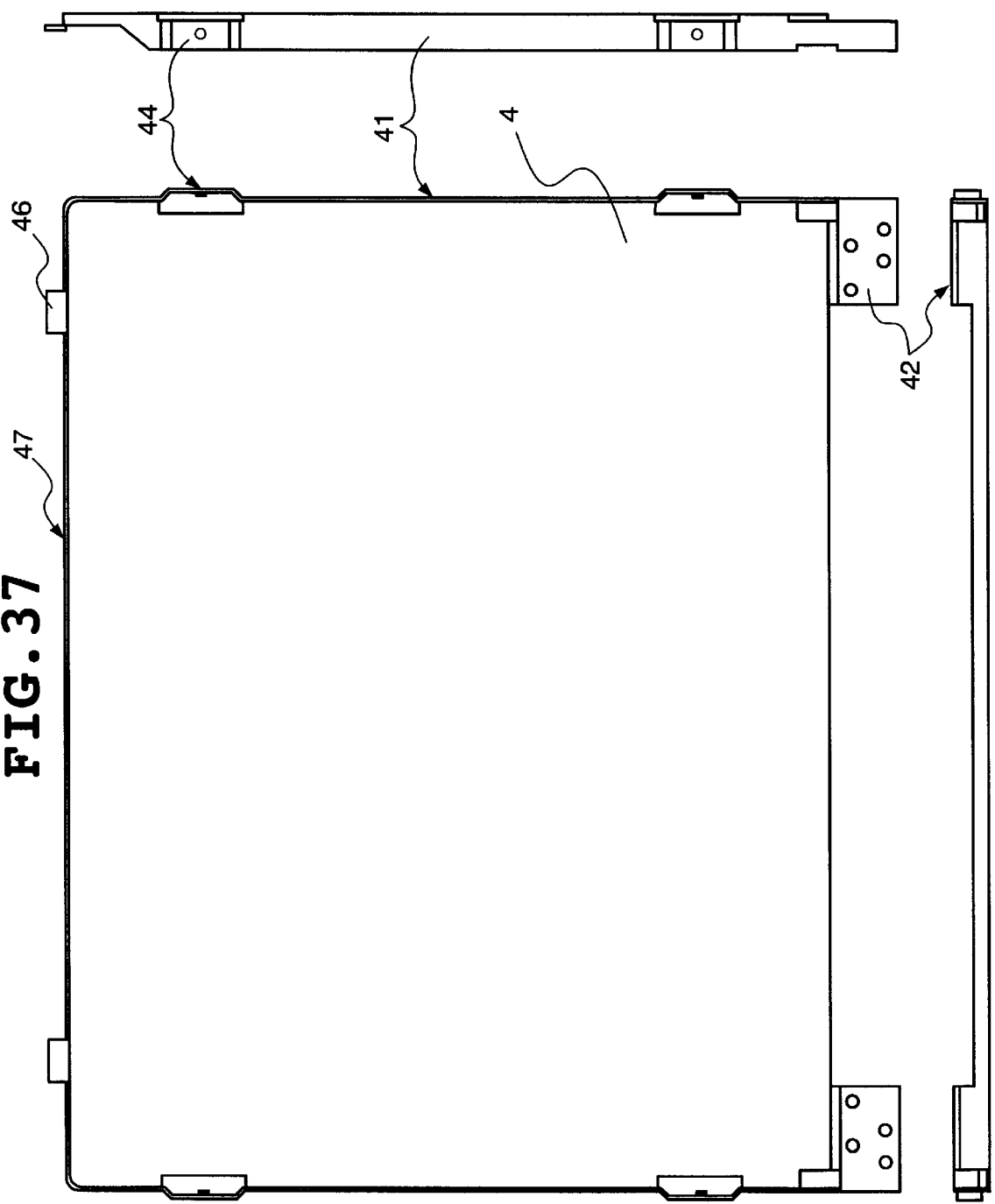
FIG. 37 is a view showing a plane surface and a side surface of a bracket of the third embodiment.

With reference to FIGS. 35, 36 and 37, the bracket 4 includes, in place of the upper tab 43 and the upper tab 45 of the first embodiment, the upper wall part 47 uprising from the upper end of the bracket 4 and the upper tab 46. Differently from the upper tab 43 of the first embodiment, the upper tab 46 has no hole for screwing.

Figure 38:
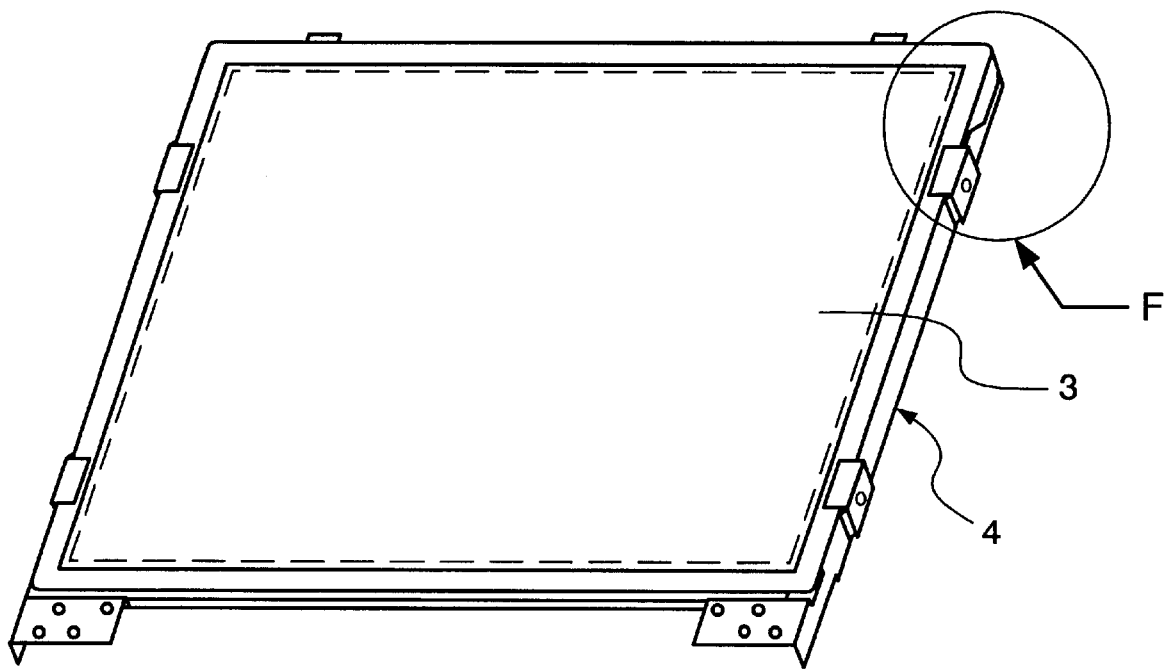
FIG. 38 is a perspective view showing a state where an LCD unit of the third embodiment is housed in the bracket.
Figure 39:
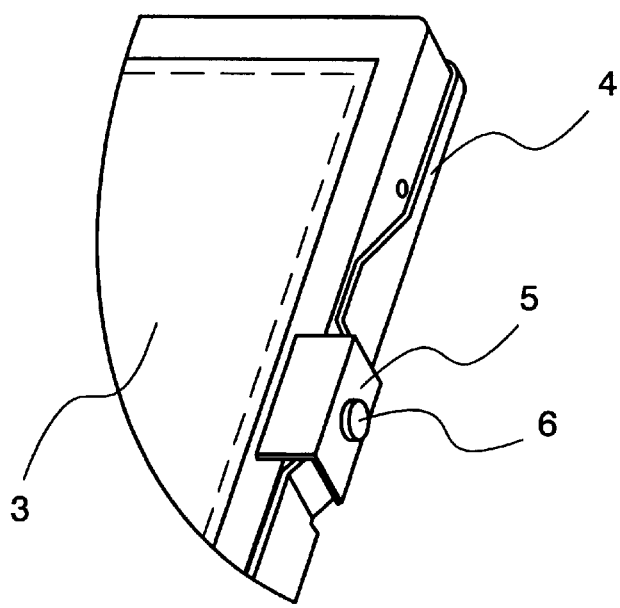
FIG. 39 is a partial expanded view of a part F of FIG. 38.

With reference to FIG. 36 which is an expanded view of the part A of FIG. 35, the side fixing piece 5 is attached to each projection part 44 of the bracket 4 by means of the screw 6. Also, as illustrated in FIG. 39 which is an expanded view of the part F of FIG. 38 as a perspective view of a state where the LCD unit 3 is attached to the bracket 4, the display surface of the LCD unit 3 is firmly installed by the side fixing piece With reference to FIG. 35, the bracket 4 is attached to the rear case 1 with the display surface held at an appropriate state by the lower tab 42 and the upper tab 46. As illustrated in the figure, the LCD unit 3 being incorporated into the bracket 4 is mounted on the rear case 1.

Figure 40:
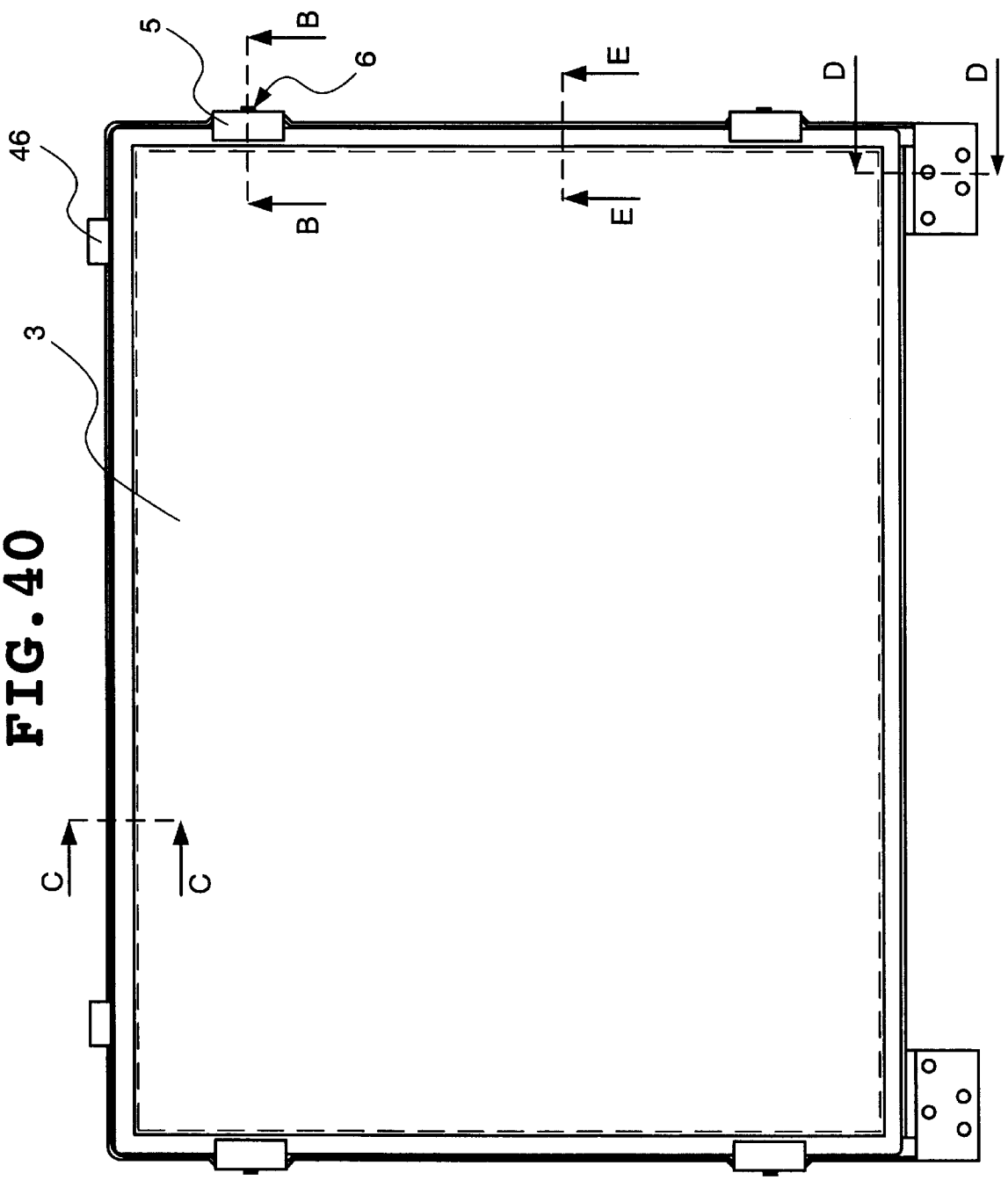
FIG. 40 is a plan view showing a state where the LCD unit of the third embodiment is housed in the bracket.

FIG. 40 is a plan view of the LCD unit 3 appropriately incorporated into the bracket 4. FIGS. 41, 42, 43 and 44 are partial sectional views taken along the lines B—B, C—C, D—D and E—E illustrated in FIG. 40, respectively.

Figure 41:
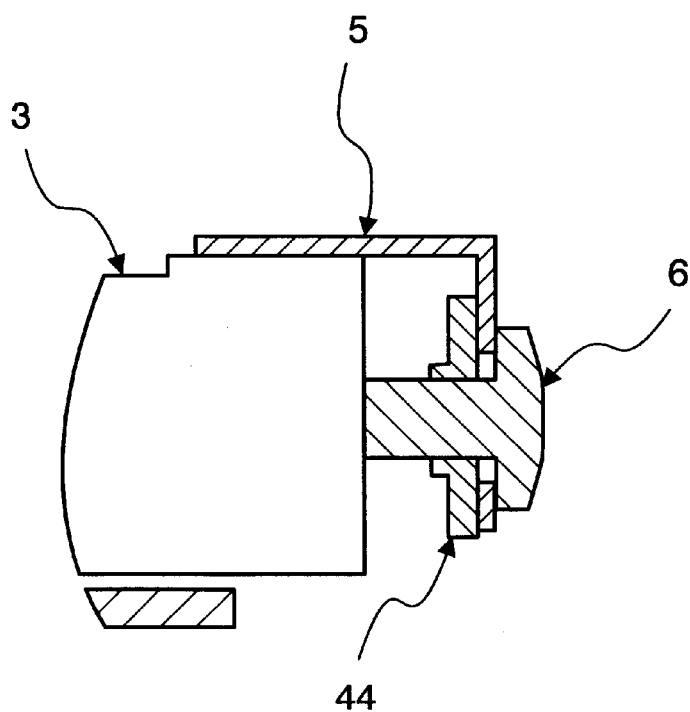
FIG. 41 is an expanded sectional view of a part taken along the line B—B of FIG. 40.

With reference to FIG. 41, the side fixing piece 5 is screwed to the projection part 44 of the bracket 4 by means of the screw 6. As a result, the LCD unit 3 is firmly installed between the side fixing piece 5 and the base plate 40 of the bracket 4.

Figure 42:
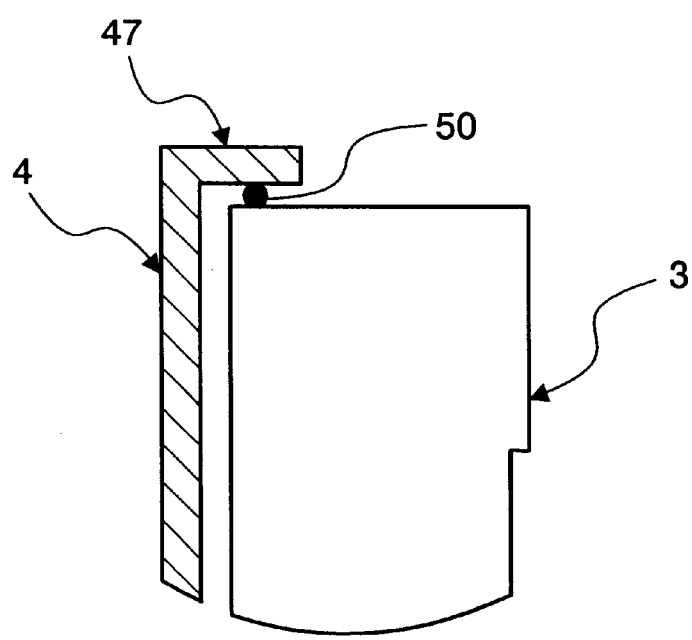
FIG. 42 is an expanded sectional view of a part taken along the line C—C of FIG. 40.
Figure 43:
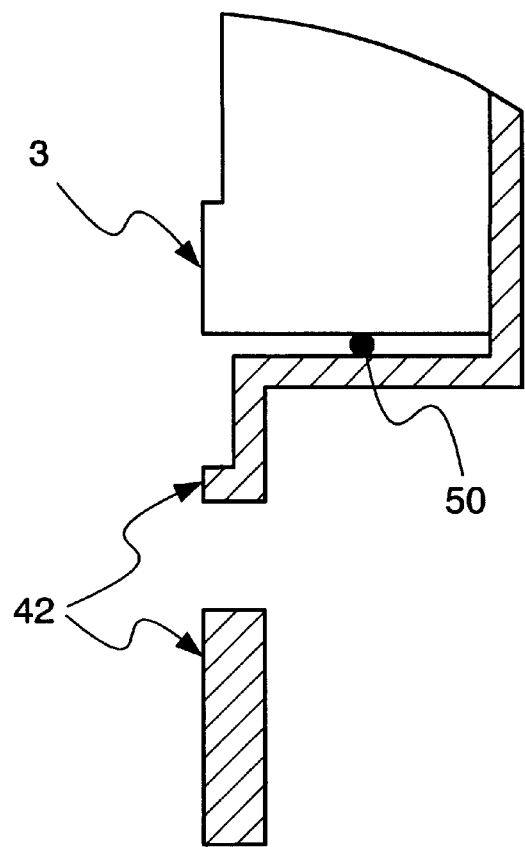
FIG. 43 is an expanded sectional view of a part taken along the line D—D of FIG. 40.
Figure 44:
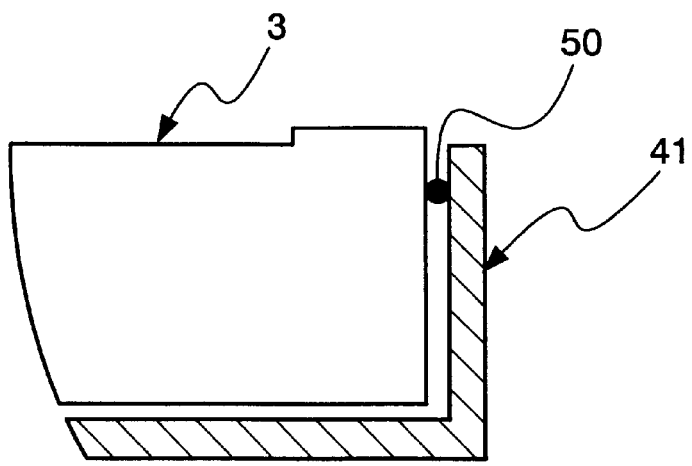
FIG. 44 is an expanded sectional view of a part taken along the line E—E of FIG. 40.

With reference to FIGS. 42, 43 and 44, the LCD unit 3 is incorporated into the bracket 4 with its upper and lower and left and right sides held by the upper wall part 47 (FIG. 42), the sidewall part 41 (FIG. 44) and the lower tab 42 (FIG. 43) uprising from the base plate 40. That at a spacing between the LCD unit 3 and these parts, the cushion member 50 is provided is the same as that in the above first and second embodiments.

Figure 45:
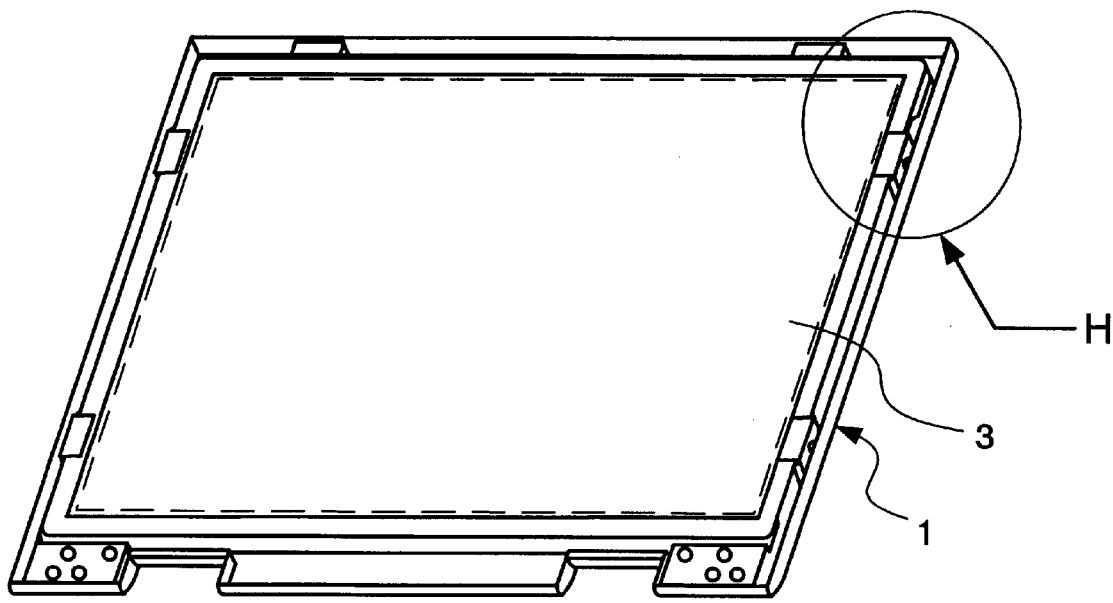
FIG. 45 is a perspective view showing a state where the LCD unit and the bracket of the third embodiment are incorporated into a rear case.
Figure 46:
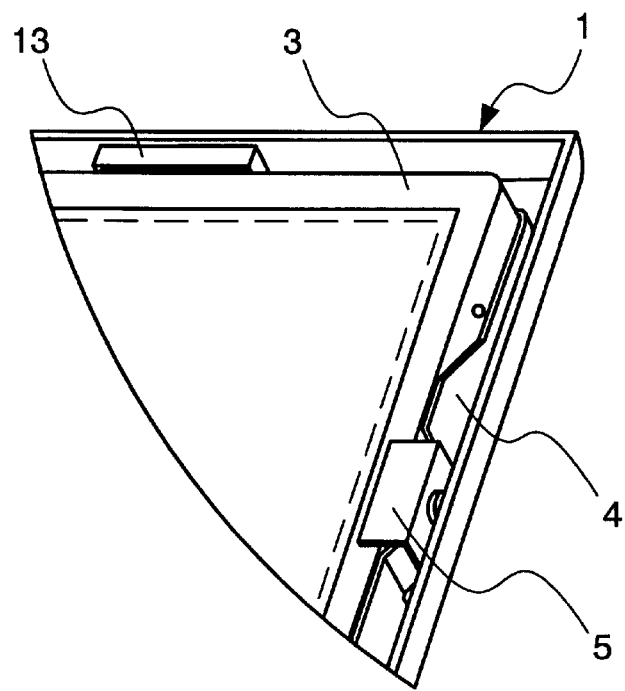
FIG. 46 is a partial expanded view of a part H of FIG. 45.
Figure 47:
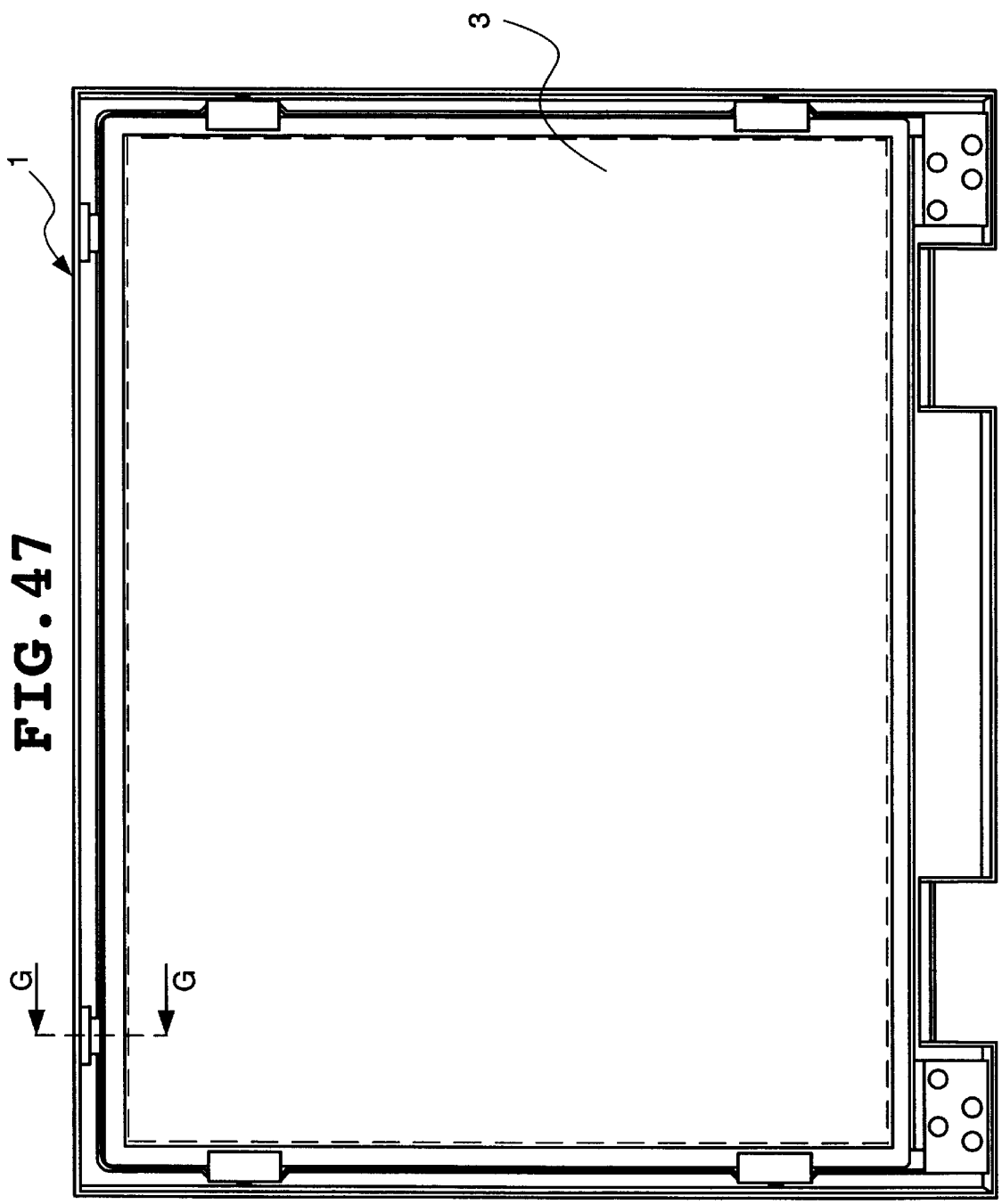
FIG. 47 is a plan view showing a state where the LCD unit and the bracket of the third embodiment are incorporated into the rear case.

As described above, the LCD unit 3 being incorporated into the bracket 4 is mounted on the rear case 1. FIGS. 45 and 47 are a perspective view and a plan view showing a state where the bracket 4 with the LCD unit 3 incorporated therein is mounted on the rear case 1, respectively.

FIG. 47 is a plan view of the LCD unit 3 and the bracket 4 mounted on the rear case 1. FIG. 48 is a partial sectional view taken along the line G—G shown in FIG. 47. With reference to FIG. 48, insertion of the upper tab 46 of the bracket 4 into the above-described holder 13 of the rear case 1 results in the upper part of the bracket 4 being held to the rear case 1.

In addition, that in the rear case 1, the lower tab 42 of the bracket 4 is screwed to the rear case 1 by the screw 8 is the same as that in the first and second embodiments.

In the third embodiment, the upper tab 46 and the holder part 13 are neither screwed nor adhered as mentioned above. The upper tab 46 is attached only through insertion into the holder part 13.

Figure 49:
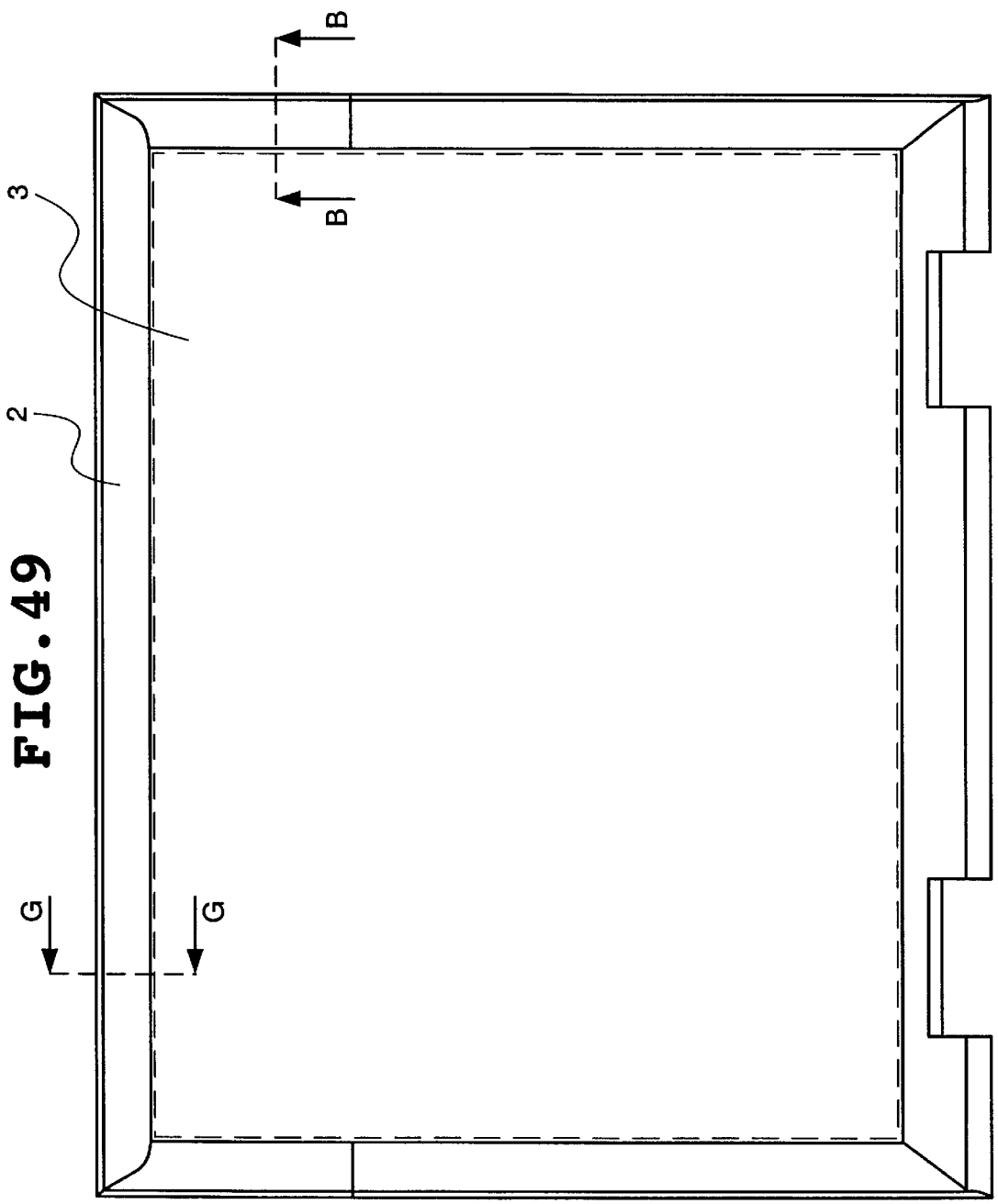
FIG. 49 is a plan view of a state where a front case of the third embodiment is mounted.
Figure 50:
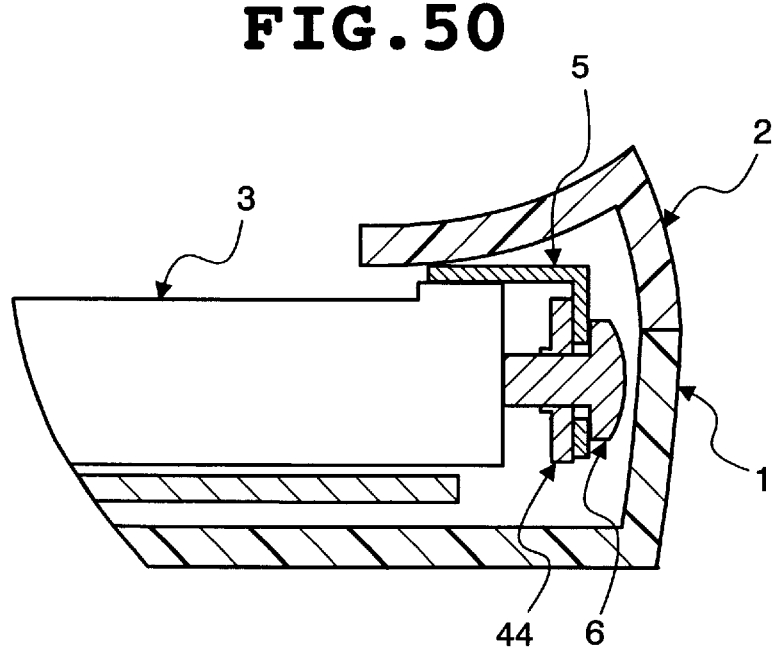
FIG. 50 is an expanded sectional view of a part taken along the line B—B of FIG. 49.
Figure 51:
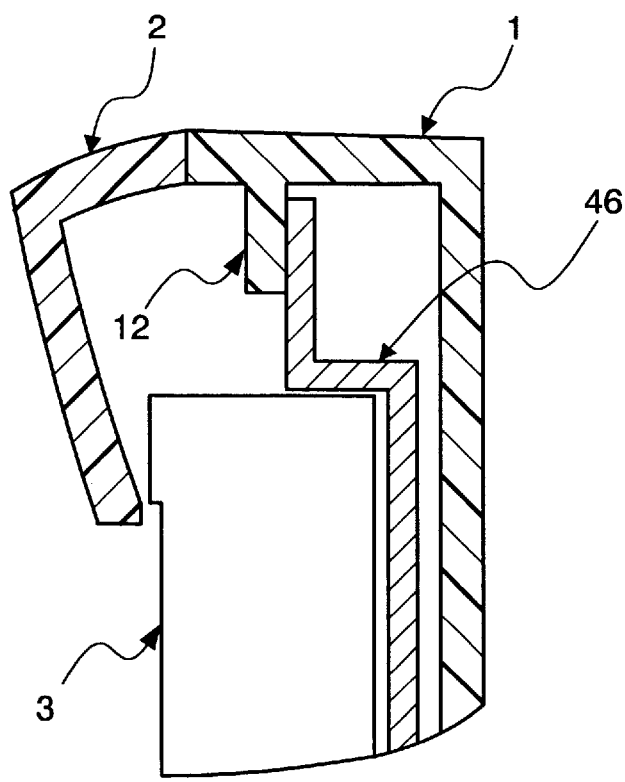
FIG. 51 is an expanded sectional view of a part taken along the line G—G of FIG. 49.

FIG. 49 is a plan view showing a state where after the bracket 4 with the LCD unit 3 incorporated therein is mounted on the rear case 1, the front side is covered with the front case 2. FIGS. 50 and 51 show partial sectional views taken along the lines B—B and G—G indicated in FIG. 49, respectively. As illustrated in FIGS. 50 and 51, the side fixing piece 5, the projection part 44, the screw 6 (FIG. 50), the upper tab 46, and the holder part 13 (FIG. 51) are covered by the front case 2.

As described in the foregoing, the liquid crystal module mounting structure of the present invention has the following effects.

First, attaching L-shaped fixing pieces at several positions of a casing for housing a liquid crystal module unit enables many kinds of liquid crystal module units to be mounted on one kind of casing with ease. The reason is that because fixing a screen peripheral part of the liquid crystal module unit through the pressing by a fixing piece is not dependent on a kind of liquid crystal module unit.

Secondly, because it is necessary neither to provide numerous holes on a casing corresponding to many kinds of liquid crystal module units nor to prepare as many attachment parts for connecting a liquid crystal module unit and the casing as the number of kinds of liquid crystal module units, problem in strength caused by the provision of numerous holes is resolved and cost reduction is realized as well.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A liquid crystal module mounting structure, wherein
at a sidewall portion of a box-formed casing for housing a liquid crystal module unit, an attachment part is provided to which a fixing piece of substantially L-shaped is attached;
wherein said attachment part is formed as an external projection of a part of the sidewall portion of said casing to have resiliency; and
said liquid crystal module unit is held by the pressing of a peripheral portion of said liquid crystal module unit housed in said casing from the side of a screen by said fixing piece attached to said attachment part.

2. The liquid crystal module mounting structure as set forth in claim 1, wherein
said attachment part is provided at four positions in the vicinity of the four corners of said casing and formed as an external projection of a part of the sidewall portion of said casing to have resiliency.

3. The liquid crystal module mounting structure as set forth in claim 1, wherein
said attachment part is formed as an external projection of a part of the sidewall portion of said casing to have resiliency, and
a screw hole is provided in said attachment part to enable said fixing piece to be attached to said attachment part by means of a screw.

4. The liquid crystal module mounting structure as set forth in claim 1, wherein
said attachment part is provided at four positions in the vicinity of the four corners of said casing and formed as an external projection of a part of the sidewall portion of said casing to have resiliency, and
a screw hole is provided in said attachment part to enable said fixing piece to be attached to said attachment part by means of a screw.

5. A liquid crystal module mounting structure, wherein
at a sidewall portion of a box-formed casing for housing a liquid crystal module unit, an attachment part is provided to which a fixing piece of substantially L-shaped is attached; and
said liquid crystal module unit is held by the pressing of a peripheral portion of said liquid crystal module unit housed in said casing from the side of a screen by said fixing piece attached to said attachment part; wherein
in the vicinity of four corners of said casing, a tab is provided for screwing to a box-formed case into which said casing is to be incorporated;
at a position on the side of said case corresponding to said tab, a boss having a screw hole is provided; and
said casing which houses said liquid crystal module unit is incorporated into said case by screwing said tab to said boss.

6. The liquid crystal module mounting structure as set forth in claim 5, wherein
said attachment part is provided at four positions in the vicinity of the four corners of said casing,
in the vicinity of the four corners of said casing, a tab is provided for screwing to a box-formed case into which said casing is to be incorporated,
at a position on the side of said case corresponding to said tab, a boss having a screw hole is provided, and
said casing which houses said liquid crystal module unit is incorporated into said case by screwing said tab to said boss.

7. The liquid crystal module mounting structure as set forth in claim 5, wherein
said attachment part is formed as an external projection of a part of the sidewall portion of said casing to have resiliency,
in the vicinity of the four corners of said casing, a tab is provided for screwing to a box-formed case into which said casing is to be incorporated,
at a position on the side of said case corresponding to said tab, a boss having a screw hole is provided, and
said casing which houses said liquid crystal module unit is incorporated into said case by screwing said tab to said boss.

8. The liquid crystal module mounting structure as set forth in claim 5, wherein
said attachment part is provided at four positions in the vicinity of the four corners of said casing and formed as an external projection of a part of the sidewall portion of said casing to have resiliency,
in the vicinity of the four corners of said casing, a tab is provided for screwing to a box-formed case into which said casing is to be incorporated,
at a position on the side of said case corresponding to said tab, a boss having a screw hole is provided, and said casing which houses said liquid crystal module unit is incorporated into said case by screwing said tab to said boss.

9. The liquid crystal module mounting structure as set forth in claim 5, wherein
   a screw hole is provided in said attachment part to enable said fixing piece to be attached to said attachment part by means of a screw,
   in the vicinity of the four corners of said casing, a tab is provided for screwing to a box-formed case into which said casing is to be incorporated,
   at a position on the side of said case corresponding to said tab, a boss having a screw hole is provided, and
   said casing which houses said liquid crystal module unit is incorporated into said case by screwing said tab to said boss.

10. The liquid crystal module mounting structure as set forth in claim 5, wherein
    said attachment part is provided at four positions in the vicinity of the four corners of said casing,
    a screw hole is provided in said attachment part to enable said fixing piece to be attached to said attachment part by means of a screw,
    in the vicinity of the four corners of said casing, a tab is provided for screwing to a box-formed case into which said casing is to be incorporated,
    at a position on the side of said case corresponding to said tab, a boss having a screw hole is provided, and
    said casing which houses said liquid crystal module unit is incorporated into said case by screwing said tab to said boss.

11. The liquid crystal module mounting structure as set forth in claim 5, wherein
    said attachment part is formed as an external projection of a part of the sidewall portion of said casing to have resiliency,
    a screw hole is provided in said attachment part to enable said fixing piece to be attached to said attachment part by means of a screw,
    in the vicinity of the four corners of said casing, a tab is provided for screwing to a box-formed case into which said casing is to be incorporated,
    at a position on the side of said case corresponding to said tab, a boss having a screw hole is provided, and
    said casing which houses said liquid crystal module unit is incorporated into said case by screwing said tab to said boss.

12. The liquid crystal module mounting structure as set forth in claim 5, wherein
    said attachment part is provided at four positions in the vicinity of the four corners of said casing and formed as an external projection of a part of the sidewall portion of said casing to have resiliency,
    a screw hole is provided in said attachment part to enable said fixing piece to be attached to said attachment part by means of a screw,
    in the vicinity of the four corners of said casing, a tab is provided for screwing to a box-formed case into which said casing is to be incorporated,
    at a position on the side of said case corresponding to said tab, a boss having a screw hole is provided, and
    said casing which houses said liquid crystal module unit is incorporated into said case by screwing said tab to said boss.

13. A liquid crystal module mounting structure, wherein
    at a sidewall portion of a box-formed casing for housing a liquid crystal module unit, an attachment part is provided to which a fixing piece of substantially L-shaped is attached; and
    said liquid crystal module unit is held by the pressing of a peripheral portion of said liquid crystal module unit housed in said casing from the side of a screen by said fixing piece attached to said attachment part; wherein
       on one of an upper portion and a lower portion of said casing, a first tab externally projecting from said sidewall is provided and on the other a second tab is provided for screwing to a box-formed case into which said casing is to be incorporated;
       at a position of said case into which said casing is to be incorporated corresponding to said first tab, a holder part is provided for allowing said first tab to be inserted and held and at a position corresponding to said second tab, a boss having a screw hole is provided; and
       said casing housing said liquid crystal module unit is incorporated into said case by inserting said first tab into said holder part and screwing said second tab to said boss.

14. The liquid crystal module mounting structure as set forth in claim 13, wherein
    said attachment part is provided at four positions in the vicinity of the four corners of said casing,
    on one of an upper portion and a lower portion of said casing, a first tab externally projecting from said sidewall is provided and on the other a second tab is provided for screwing to a box-formed case into which said casing is to be incorporated,
    at a position of said case into which said casing is to be incorporated corresponding to said first tab, a holder part is provided for allowing said first tab to be inserted and held and at a position corresponding to said second tab, a boss having a screw hole is provided,
    and said casing housing said liquid crystal module unit is incorporated into said case by inserting said first tab into said holder part and screwing said second tab to said boss.

15. The liquid crystal module mounting structure as set forth in claim 13, wherein
    said attachment part is formed as an external projection of a part of the sidewall portion of said casing to have resiliency,
    on one of an upper portion and a lower portion of said casing, a first tab externally projecting from said sidewall is provided and on the other a second tab is provided for screwing to a box-formed case into which said casing is to be incorporated,
    at a position of said case into which said casing is to be incorporated corresponding to said first tab, a holder part is provided for allowing said first tab to be inserted and held and at a position corresponding to said second tab, a boss having a screw hole is provided, and
    said casing housing said liquid crystal module unit is incorporated into said case by inserting said first tab into said holder part and screwing said second tab to said boss.

16. The liquid crystal module mounting structure as set forth in claim 13, wherein
    said attachment part is provided at four positions in the vicinity of the four corners of said casing and formed as an external projection of a part of the sidewall portion of said casing to have resiliency, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, and said casing housing said liquid crystal module unit is incorporated into said case by inserting said first tab into said holder part and screwing said second tab to said boss.

17. The liquid crystal module mounting structure as set forth in claim 13, wherein a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, and said casing housing said liquid crystal module unit is incorporated into said case by inserting said first tab into said holder part and screwing said second tab to said boss.

18. The liquid crystal module mounting structure as set forth in claim 13, wherein said attachment part is provided at four positions in the vicinity of the four corners of said casing, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, and said casing housing said liquid crystal module unit is incorporated into said case by inserting said first tab into said holder part and screwing said second tab to said boss.

19. The liquid crystal module mounting structure as set forth in claim 13, wherein said attachment part is formed as an external projection of a part of the sidewall portion of said casing to have resiliency, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, and said casing housing said liquid crystal module unit is incorporated into said case by inserting said first tab into said holder part and screwing said second tab to said boss.

20. The liquid crystal module mounting structure as set forth in claim 13, wherein said attachment part is provided at four positions in the vicinity of the four corners of said casing and formed as an external projection of a part of the sidewall portion of said casing to have resiliency, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, and said casing housing said liquid crystal module unit is incorporated into said case by inserting said first tab into said holder part and screwing said second tab to said boss.

21. The liquid crystal module mounting structure as set forth in claim 13, wherein on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at a position inwardly apart from the sidewall of said case.

22. The liquid crystal module mounting structure as set forth in claim 13, wherein said attachment part is provided at four positions in the vicinity of the four corners of said casing, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at a position inwardly apart from the sidewall of said case.

23. The liquid crystal module mounting structure as set forth in claim 13, wherein said attachment part is formed as an external projection of a part of the sidewall portion of said casing to have resiliency, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at a position inwardly apart from the sidewall of said case.

24. The liquid crystal module mounting structure as set forth in claim 13, wherein said attachment part is provided at four positions in the vicinity of the four corners of said casing and formed as an external projection of a part of the sidewall portion of said casing to have resiliency, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at a position inwardly apart from the sidewall of said case.

25. The liquid crystal module mounting structure as set forth in claim 13, wherein a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at a position inwardly apart from the sidewall of said case.

26. The liquid crystal module mounting structure as set forth in claim 13, wherein said attachment part is provided at four positions in the vicinity of the four corners of said casing, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at a position inwardly apart from the sidewall of said case.

27. The liquid crystal module mounting structure as set forth in claim 13, wherein said attachment part is formed as an external projection of a part of the sidewall portion of said casing to have resiliency, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at a position inwardly apart from the sidewall of said case.

28. The liquid crystal module mounting structure as set forth in claim 13, wherein said attachment part is provided at four positions in the vicinity of the four corners of said casing and formed as an external projection of a part of the sidewall portion of said casing to have resiliency, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at a position inwardly apart from the sidewall of said case.

29. The liquid crystal module mounting structure as set forth in claim 13, wherein on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at the sidewall portion of said case.

30. The liquid crystal module mounting structure as set forth in claim 13, wherein said attachment part is provided at four positions in the vicinity of the four corners of said casing, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at the sidewall portion of said case.

31. The liquid crystal module mounting structure as set forth in claim 13, wherein said attachment part is formed as an external projection of a part of the sidewall portion of said casing to have resiliency, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at the sidewall portion of said case.

32. The liquid crystal module mounting structure as set forth in claim 13, wherein said attachment part is provided at four positions in the vicinity of the four corners of said casing and formed as an external projection of a part of the sidewall portion of said casing to have resiliency, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at the sidewall portion of said case.

33. The liquid crystal module mounting structure as set forth in claim 13, wherein a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at the sidewall portion of said case.

34. The liquid crystal module mounting structure as set forth in claim 13, wherein said attachment part is provided at four positions in the vicinity of the four corners of said casing, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at the sidewall portion of said case.

35. The liquid crystal module mounting structure as set forth in claim 13, wherein said attachment part is formed as an external projection of a part of the sidewall portion of said casing to have resiliency, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at the sidewall portion of said case.

36. The liquid crystal module mounting structure as set forth in claim 13, wherein said attachment part is provided at four positions in the vicinity of the four corners of said casing and formed as an external projection of a part of the sidewall portion of said casing to have resiliency, a screw hole is provided in said attachment part to enable said fixing piece to be attached to said attachment part by means of a screw, on one of an upper portion and a lower portion of said casing, a first tab externally projecting from said sidewall is provided and on the other a second tab is provided for screwing to a box-formed case into which said casing is to be incorporated, at a position of said case into which said casing is to be incorporated corresponding to said first tab, a holder part is provided for allowing said first tab to be inserted and held and at a position corresponding to said second tab, a boss having a screw hole is provided, said casing housing said liquid crystal module unit is incorporated into said case by inserting said first tab into said holder part and screwing said second tab to said boss, and said holder part of said case is formed into a pocket whose section is L-shaped at the sidewall portion of said case.

* * * * *